US012210724B2

(12) United States Patent
Galardo et al.

(10) Patent No.: US 12,210,724 B2
(45) Date of Patent: Jan. 28, 2025

(54) SERVERS, SYSTEMS, AND METHODS FOR AN INDUSTRIAL METAVERSE

(71) Applicant: Aveva Software, LLC, Lake Forest, CA (US)

(72) Inventors: Maurizio Galardo, Milan (IT); Alessandro Giusti, Milan (IT); Simon Bennett, Cambridge (GB)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 18/199,733

(22) Filed: May 19, 2023

(65) Prior Publication Data

US 2023/0376162 A1    Nov. 23, 2023

Related U.S. Application Data

(60) Provisional application No. 63/343,884, filed on May 19, 2022.

(51) Int. Cl.
*G06F 3/04815* (2022.01)
*G06F 3/0484* (2022.01)
*G06T 17/00* (2006.01)

(52) U.S. Cl.
CPC ........ *G06F 3/04815* (2013.01); *G06F 3/0484* (2013.01); *G06T 17/00* (2013.01)

(58) Field of Classification Search
None
See application file for complete search history.

(56) References Cited

U.S. PATENT DOCUMENTS

| 2017/0199645 | A1* | 7/2017 | Troy | G06F 3/04815 |
| 2018/0004393 | A1* | 1/2018 | Ens | G06F 3/011 |

(Continued)

FOREIGN PATENT DOCUMENTS

| CN | 114020474 A | 2/2022 |
| WO | 2020229841 A1 | 11/2020 |
| WO | 2022010697 A1 | 1/2022 |

OTHER PUBLICATIONS

International Search Report and Written Opinion in related International Application No. PCT/US2023/022933 dated Sep. 14, 2023, 7 pages.

*Primary Examiner* — Toan H Vu
(74) *Attorney, Agent, or Firm* — Dergosits & Noah LLP; Todd A. Noah

(57) ABSTRACT

In some embodiments, the system includes a virtual reality environment that includes a digital twin of at least a portion of a physical industrial environment. In some embodiments, the system is configured to change the virtual reality environment based on changes in the physical industrial environment. In some embodiments, the changes are received by the system through sensors such as temperature and/or pressure sensors, as non-limiting examples. In some embodiments, the changes in the physical environment are detected through the analysis of images. In some embodiments, the system is configured to use artificial intelligence to detect the changes. In some embodiments, the system is configured to predict the effect of changes in the virtual and/or physical environment on other system components through variable changes in virtual models. In some embodiments, the system is configured to display the effects in the virtual environment before they are implemented in the physical environment.

15 Claims, 55 Drawing Sheets

(56) References Cited

U.S. PATENT DOCUMENTS

| | | | |
|---|---|---|---|
| 2021/0274155 A1 | 9/2021 | Yun et al. | |
| 2022/0051180 A1 | 2/2022 | Altieri | |
| 2022/0075339 A1* | 3/2022 | Lutz | G05B 19/054 |
| 2023/0007085 A1* | 1/2023 | Berliner | G06F 3/04815 |
| 2023/0315247 A1* | 10/2023 | Pastrana | G06F 1/1694 |
| | | | 715/716 |

* cited by examiner

XR Modules General Analysis

Concept

The Purpose is to define what XR Modules are. Main goal is to define a new approach to support all the XR applications (Desktop mouse and keyboard, Touch, VR, mobile and HoloLens 2) and the AVEVA products: CVP SDK and XR Studio. These modules are micro and independent components that allow you to configure your template and create your customized application.

The objective is to create with the new XR Modules, a new and universal standard approach for our XR Studio templates, applications, and CVP integration through a "meta" script (glue code). The XR Modules can be used as single independent and customizable components.

The XR Modules are independent from the templates, and they can be easily maintained and customized by the XR App Team and AVEVA users (CVP SDK or XR Studio).

With this new approach we can standardize the user experience across the present and the future of AVEVA XR.

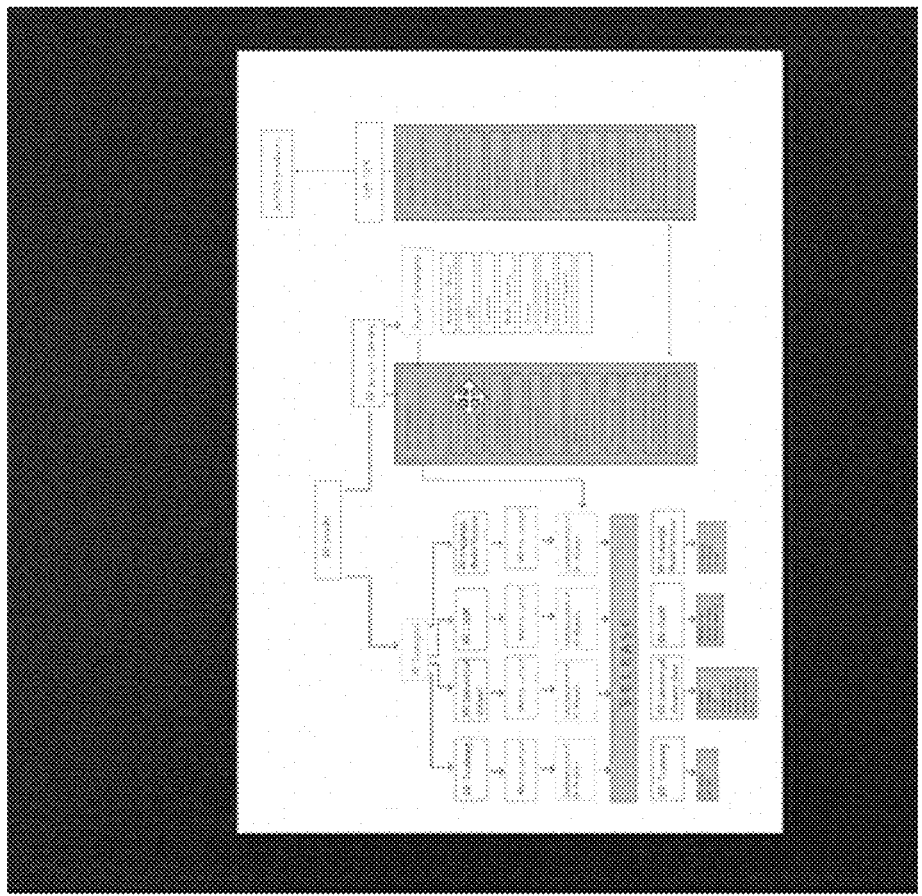

FIG. 46

SERVERS, SYSTEMS, AND METHODS FOR AN INDUSTRIAL METAVERSE

CROSS-REFERENCE TO RELATED APPLICATION

This application claims the benefit of and priority to U.S. Provisional Application No. 63/343,884, filed May 19, 2022, of which is hereby incorporated herein by reference in its entirety for all purposes.

BACKGROUND

An industrial organization often owns a multitude of systems which are sometimes separated by great distances. Currently, problems that arise with specific sensors or equipment can typically only be viewed and analyzed by an operator or technician in a particular location. While three-dimensional (3D) models can offer additional insight, they still typically fail to provide many of the insights which can be obtained by physical or appropriate remote analyses.

Customers need to asynchronously access multiple systems and software products and services to gain access to their digital representation of their physical assets. Additionally, collaboration environments are often limited to VoIP technologies and screen sharing. Collaboration is sequential, prone to error and limited in scope for accessing the vast amount of data for many assets.

Therefore, there is a need in the art for an industrial environment with at least some immersive capabilities (hereinafter referred to as an "industrial metaverse") that enables at least one person to be fully immersed in a realistic industrial environment and which provides collaboration capabilities in fully immersive, partially immersive or non-immersive ways.

SUMMARY

Systems and methods described herein are directed to an industrial metaverse (hereafter, the "system") that includes one or more virtual environments. In some embodiments, the one or more one or more virtual environments include a virtual representation of an industrial environment. In some embodiments, an industrial environment includes one or more components. In some embodiments, one or more components include one or more software and/or hardware components.

In some embodiments, software components include programming instructions for executing one or more computer implemented steps. In some embodiments, hardware components include one or more computers including one or more non-transitory computer readable media for storing the programming instructions, and one or more processors for executing the programming instructions and implementing computer code steps.

In some embodiments, the one or more computers includes a virtual display. In some embodiments, the virtual display is configured to couple to a user's head, where at least a portion of the virtual display is configured to move with the user and/or remain in the user's field of vision as the user moves their head. In some embodiments, the virtual display is configured to enable a perspective view of a virtual environment to change while the virtual display remains in the user's field of vision.

In some embodiments, the virtual display is configured to prevent outside light from entering a user's field of view. In some embodiments, the virtual display is configured to enable some or all light to enter a user's field of view. In some embodiments, the visual display is configured to display at least a portion of a proximate environment (e.g., the physical room where the user is located) in the user's field of view. In some embodiments, the visual display is configured to enable the user to see a proximate environment through at least a portion of the visual display.

In some embodiments, a first visual display is configured to enable a user to see at least a portion of what is being displayed and/or has been displayed in a second visual display. In some embodiments, a virtual display includes a virtual reality (VR) headset (e.g., Meta Quest® 2 or other commercially available headsets). In some embodiments, the virtual display includes an augmented reality headset and/or augmented reality glasses which are commercially available, as non-limiting examples. In some embodiments, the virtual display includes one or more of a screen (e.g., computer screen), a projector, a cellular phone, a tablet, an LED display, OLED display, joysticks, controllers, power sources, and/or any conventional display and/associated control equipment configured to enable a user to view and/or manipulate a digital image.

In some embodiments, software includes one or more rendering software that when executed, generate a virtual (e.g., 3D) environment. In some embodiments, the software includes one or more analysis software configured to provide an analysis display of raw data (e.g., time-series) data. In some embodiments, the analysis display includes analysis items such as one or more charts, graphs, images, videos, statistics, and/or any conventional analysis used in industrial environments. In some embodiments, the software includes programming instructions configured to display the analysis display in the virtual environment. In some embodiments, the programming instructions are configured to enable a user to execute a manipulation of one or more analysis displays in the virtual environment.

In some embodiments, the analysis display includes a virtual screen. In some embodiments, the virtual screen is configured to display one or more analyses and/or analysis results. In some embodiments, the manipulation includes moving the virtual screen from one location to another location within the 3D environment. In some embodiments, the manipulation includes selection of one or more analysis items within the analysis display.

In some embodiments, hardware includes one or more physical components. In some embodiments, non-limiting examples of physical components include one or more pumps, sensors, reactors, pipes, valves, heaters, stairs, tanks, vehicles, drones, lights, scaffolding, floors, ceilings, earth, water, sky, sun, moon, stars, and/or any conventional physical structure found in a real (also known as "in real life") environment. In some embodiments, software includes programming instructions configured to generate one or more virtual components. In some embodiments, the one or more virtual components include a virtual rendering of one or more physical components.

In some embodiments, the disclosure is directed to a system for generating a virtual environment. In some embodiments, the system includes one or more computers comprising one or more processors and one or more non-transitory computer readable media. In some embodiments, the one or more non-transitory computer readable media comprise program instructions stored thereon that when executed cause the one or more computers to implement one or more computer steps described herein.

In some embodiments, a step includes to generate, by the one or more processors, a virtual environment comprising a three-dimensional (3D) representation of at least a portion of a physical industrial environment. In some embodiments, a step includes to generate, by the one or more processors, an asset link between one or more virtual assets in the virtual environment to one or more physical assets in the physical industrial environment. In some embodiments, a step includes to generate, by the one or more processors, a data link between the virtual environment and a historian database, the historian database comprising asset data about the one or more physical assets. In some embodiments, a step includes to generate, by the one or more processors, a virtual graphical user interface (GUI) in the virtual environment, the virtual GUI configured to enable a user to access and display the asset data in the virtual environment. In some embodiments, a step includes to generate, by the one or more processors, one or more user controls in the virtual environment, the one or more user controls configured to navigate the virtual environment, select the one or more virtual assets, and/or control the virtual GUI.

In some embodiments, a display of the virtual environment in a user's field of view is configured to change based on a position change of a user's head. In some embodiments, the asset data comprises at least one analytical result of raw data associated with the one or more virtual assets. In some embodiments, selecting the one or more virtual assets comprises a manipulation of a virtual asset actuator. In some embodiments, the manipulation of the virtual asset actuator results in a remote manipulation of a corresponding physical asset actuator. In some embodiments, the physical asset actuator includes one or more of a lever, a valve, a switch, and a computer setting.

In some embodiments, the one or more non-transitory computer readable media further comprise program instructions stored thereon that when executed cause the one or more computers to generate, by the one or more processors, one or more virtual models of the one or more physical assets. In some embodiments, the one or more virtual models each comprise one or more mathematical equations configured to represent a physical behavior of the one or more physical assets. In some embodiments, selecting the one or more virtual assets comprises a virtual manipulation of a virtual asset controller.

In some embodiments, the virtual manipulation causes a change in one or more variables of the one or more virtual models. In some embodiments, an effect of the change in the one or more variables is displayed in the virtual environment. In some embodiments, the effect is a virtual effect. In some embodiments, the virtual effect comprises theoretical results from calculations performed by the one or more virtual models. In some embodiments, the virtual effect does not include a change to the one or more physical assets. In some embodiments, the one or more non-transitory computer readable media further comprise program instructions stored thereon that when executed cause the one or more computers to execute, by the one or more processors, a command by the user for a physical manipulation of the one or more physical assets corresponding to the virtual manipulation after the virtual effect occurs in the virtual environment.

In some embodiments, the one or more non-transitory computer readable media further comprising program instructions stored thereon that when executed cause the one or more computers to receive, by the one or more processors, one or more images of the one or more physical assets. In some embodiments, a step includes to execute, by the one or more processors, a comparison of the one or more images to one or more previous images of the one or more physical assets. In some embodiments, a step includes to execute, by the one or more processors, an identification of a visual change in the one or more images based on the comparison. In some embodiments, a step includes to alter, by the one or more processors, the one or more virtual assets in the virtual environment to reflect the visual change in the one or more images. In some embodiments, the comparison includes an execution of an artificial intelligence. In some embodiments, the artificial intelligence is trained using at least a portion of the one or more previous images. In some embodiments, the one or more non-transitory computer readable media further comprising program instructions stored thereon that when executed cause the one or more computers to predict, by the one or more processors, a variable change in one or more virtual models based on the visual change.

In some embodiments, selection of the one or more virtual assets in the virtual environment is configured to cause a display of a time-series graph to be generated in the virtual environment. In some embodiments, the one or more virtual assets are connected to the one or more physical assets through a software-as-a-service (SaaS) subscription program. In some embodiments, the physical industrial environment includes a supervisory control and data acquisition (SCADA) platform configured to monitor and/or control the one or more physical assets. In some embodiments, at least a portion of the SCADA can be accessed via the virtual environment.

DRAWING DESCRIPTION

FIG. 46 shows an overview of the concept of XR Modules according to some embodiments.

Figure 54:
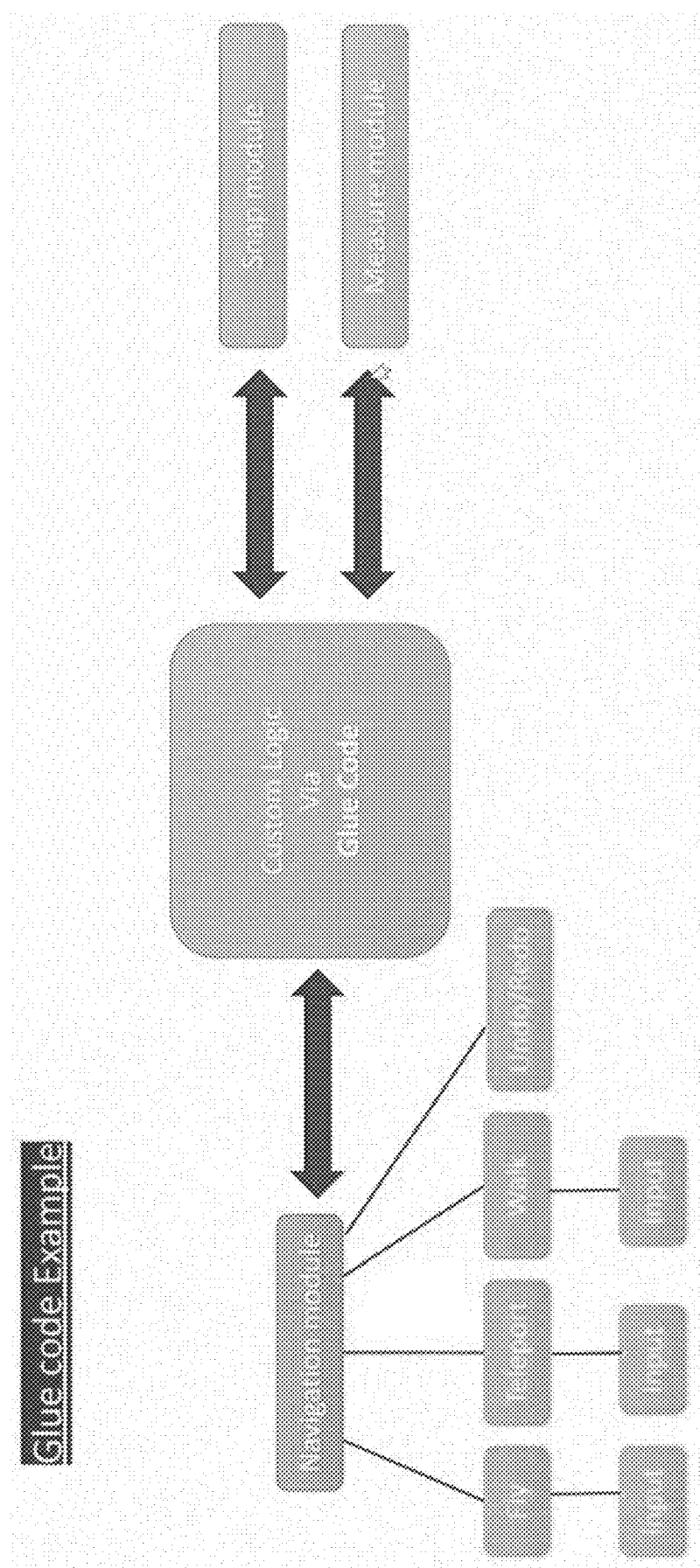

FIG. 54 includes an example glue code according to some embodiments.

Figure 55:
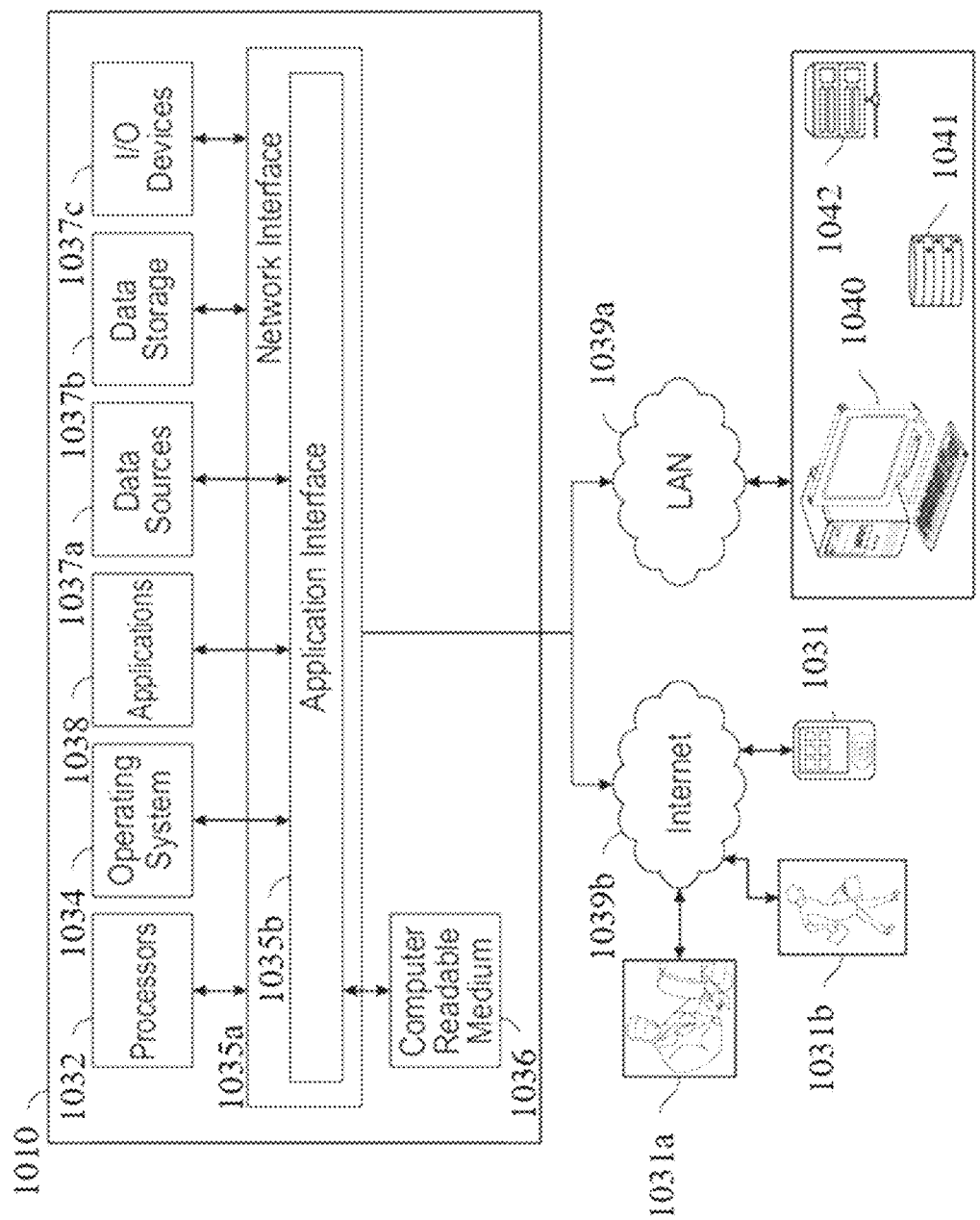

FIG. 55 illustrates a computer system 1010 enabling or comprising the systems and methods in accordance with some embodiments of the system.

DETAILED DESCRIPTION

The following non-limiting examples are intended to aid those of ordinary skill understand how to make and use various combinations of the systems and methods presented herein according to some embodiments. It is understood that each example is part of the system as a whole, and that some embodiments presented herein are readily combinable with some other embodiments. Therefore, any portion and/or combination of portions of the description of the system according to some embodiments as presented in this disclosure can be used to define the metes and bounds for which protection is sought.

Figure 1:
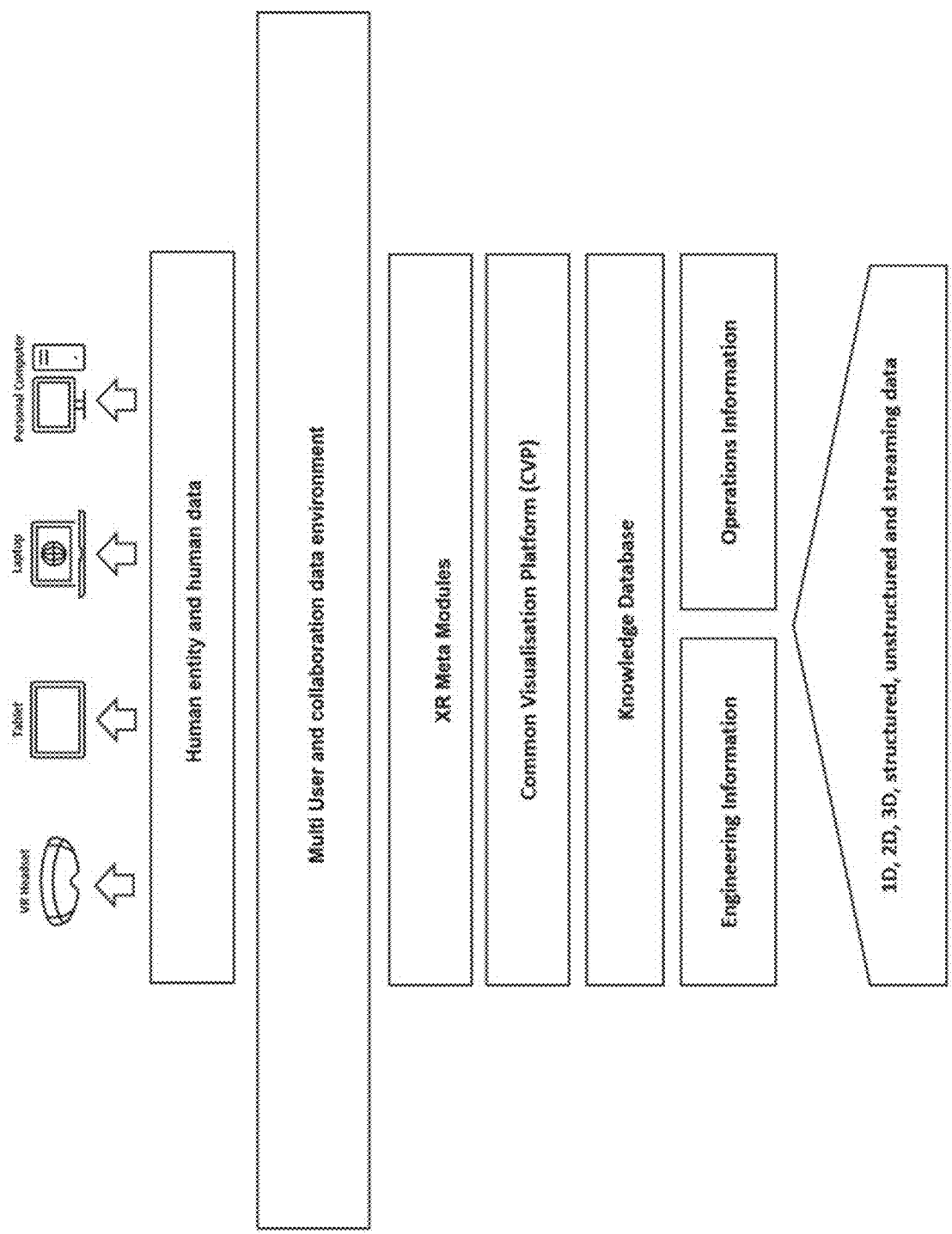
FIG. 1 shows a high level schematic of the system representing a portion of the multiple features and technology according to some embodiments.

FIG. 1 shows a high level schematic of the system representing a portion of the system's multiple features and technologies according to some embodiments. In some embodiments, the system includes one or more virtual displays that include one or more VR headsets, tablets, laptops, and/or personal computers according to some embodiments. In some embodiments, the virtual displays are configured to interface with a user and/or data. In some embodiments, the system is configured to generate a multi-user environment for collaboration. In some embodiments, the system is configured to generate a first perspective for a first user in a multi-user environment, while simultaneously generating a second perspective for a second user in the same multi-user environment. In some embodiments, the system includes one or more of XR (Meta) Modules, Common Visualization Platforms (CVP), Knowledge Databases, Engineering Information, Operations Information, as well as 1D, 2D, 3D, structured, and streaming data.

In some embodiments, the system comprises a number of features which, when combined, deliver a virtual environment for multiple users to collaborate on engineering and operations information agnostic of their interfacing hardware. In some embodiments, information from simulation, 3D computer aided drafting (CAD), engineering data and operational sensor data is combined using a knowledge graph system and generates a visualization technology layer which presents this information for live interaction in a virtual (e.g., 3D) environment.

In some embodiments, the system is configured to generate a virtual environment to securely interact with colleagues and partners (i.e., users). In some embodiments, the system is configured to enable users to gain access to the linked information connected to the objects in the virtual environment. In some embodiments, the system is configured to display live operational information (e.g., component information) in a 3D (virtual) or other environment. In some embodiments, the system is configured to enable multiple device types to connect, allowing a variety of rich interactions which include viewing different perspectives and/or viewing the same perspectives, as well as manipulations of items in the virtual environment. In some embodiments, the system includes real time collaboration, multiple hardware device support or a semantic collation of information in a knowledge graph.

In some embodiments, the system comprises micro and independent module components that enable configuration and can create customized applications. In some embodiments, the module components include XR meta modules. In some embodiments, XR meta modules include a "meta" script (i.e., glue code). In some embodiments, the XR meta Modules can be used as single independent and customizable components. In some embodiments, one or more XR meta modules include with pre-configured variables. In some embodiments, each variable is calibrated for one or more situations. In some embodiments, one or more hardware components (e.g., Desktop, Touch, VR, HoloLens, Mobile, etc.) are tested and calibrated to give the best user experience.

Figure 2:
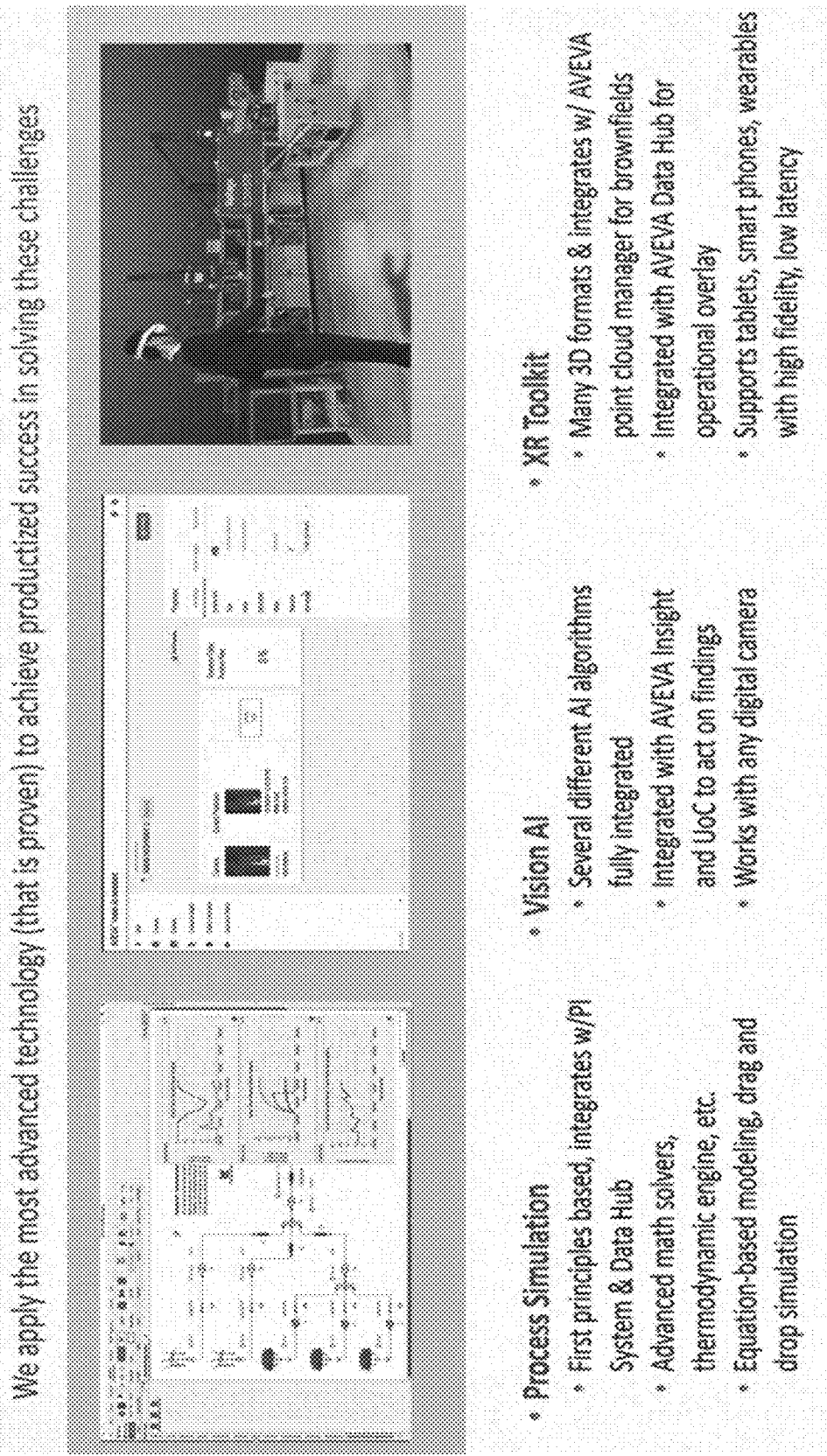
FIG. 2 illustrates three non-limiting examples of platforms integrated into the system according to some embodiments.

In some embodiments, the XR meta modules are independent from the applications, and can be easily maintained and customized through a Low code or No code approach for the end users while creating the desired data exchange interaction. In some embodiments, these modules are ready to use, with very low configuration effort but with many customizations available. In this way, the system creates a common standard for all AVEVA products that easily suits most or all of the user's requests according to some embodiments. FIG. 2 illustrates three non-limiting examples of platforms integrated into the system according to some embodiments.

Figure 3:
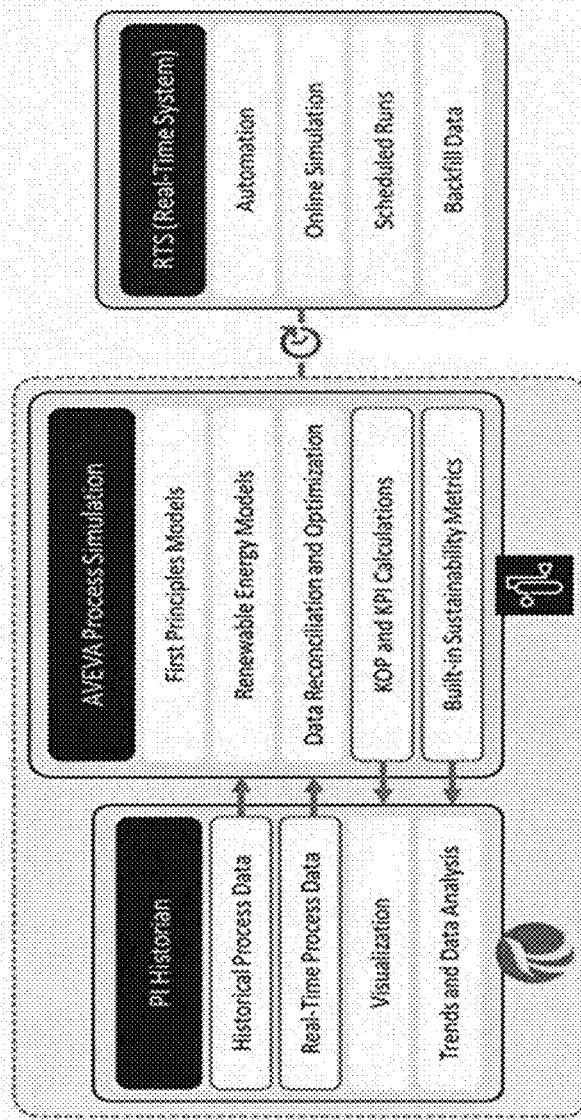
FIG. 3 illustrates one or more system module integrations for process simulation, AVEVA PI, and AVEVA Data Hub according to some embodiments.

In some embodiments, the system is configured to generate and/or display process simulation. In some embodiments, process simulation includes first principles based models. In some embodiments, the first principles based models are integrated with analysis software such as AVEVA PI software and/or AVEVA Data Hub, as non-limiting examples. FIG. 3 illustrates one or more system module integrations for process simulation, AVEVA PI, and AVEVA Data Hub according to some embodiments.

Figure 4:
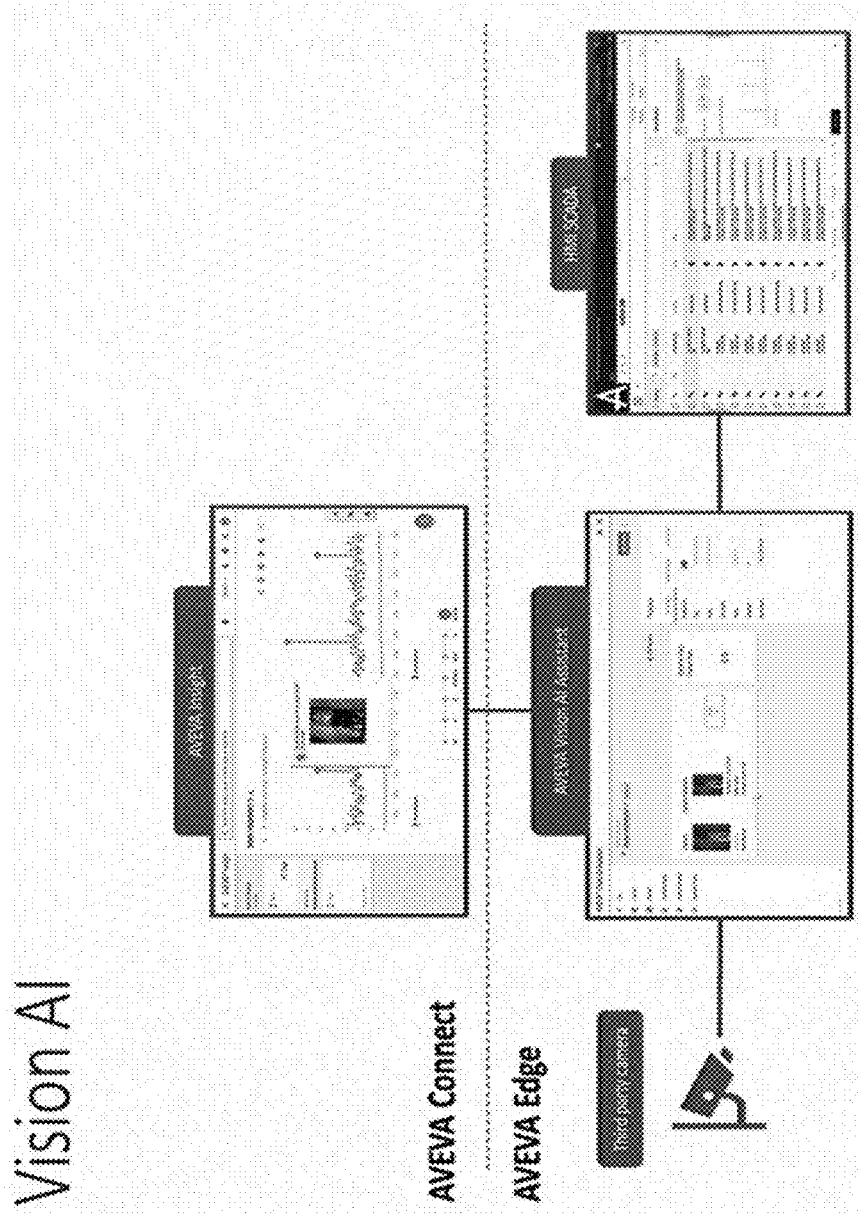
FIG. 4 illustrates one or more system module integrations for AVEVA Insight, third party cameras, AVEVA VISION AI, and a human-machine interface supervisory control and data acquisition system (HMI SCADA) according to some embodiments.

In some embodiments, the system includes artificial intelligence (AI) software, such as AVEVA Vision AI, as a non-limiting example. In some embodiments, the system includes one or more AI algorithms. In some embodiments, the system is configured to be integrated with a secure, managed, software-as-a-service (SaaS) solution for collecting, storing, and visualizing industrial data for faster, smarter business decisions. A non-limiting example of a SaaS includes AVEVA Insight, which consolidates disparate data for complete visibility into how components are performing, and enables users, throughout an organization, to access data from anywhere. FIG. 4 illustrates one or more system module integrations for AVEVA Insight, third party cameras, AVEVA VISION AI, and a human-machine interface supervisory control and data acquisition system (HMI SCADA) according to some embodiments.

Figure 5:
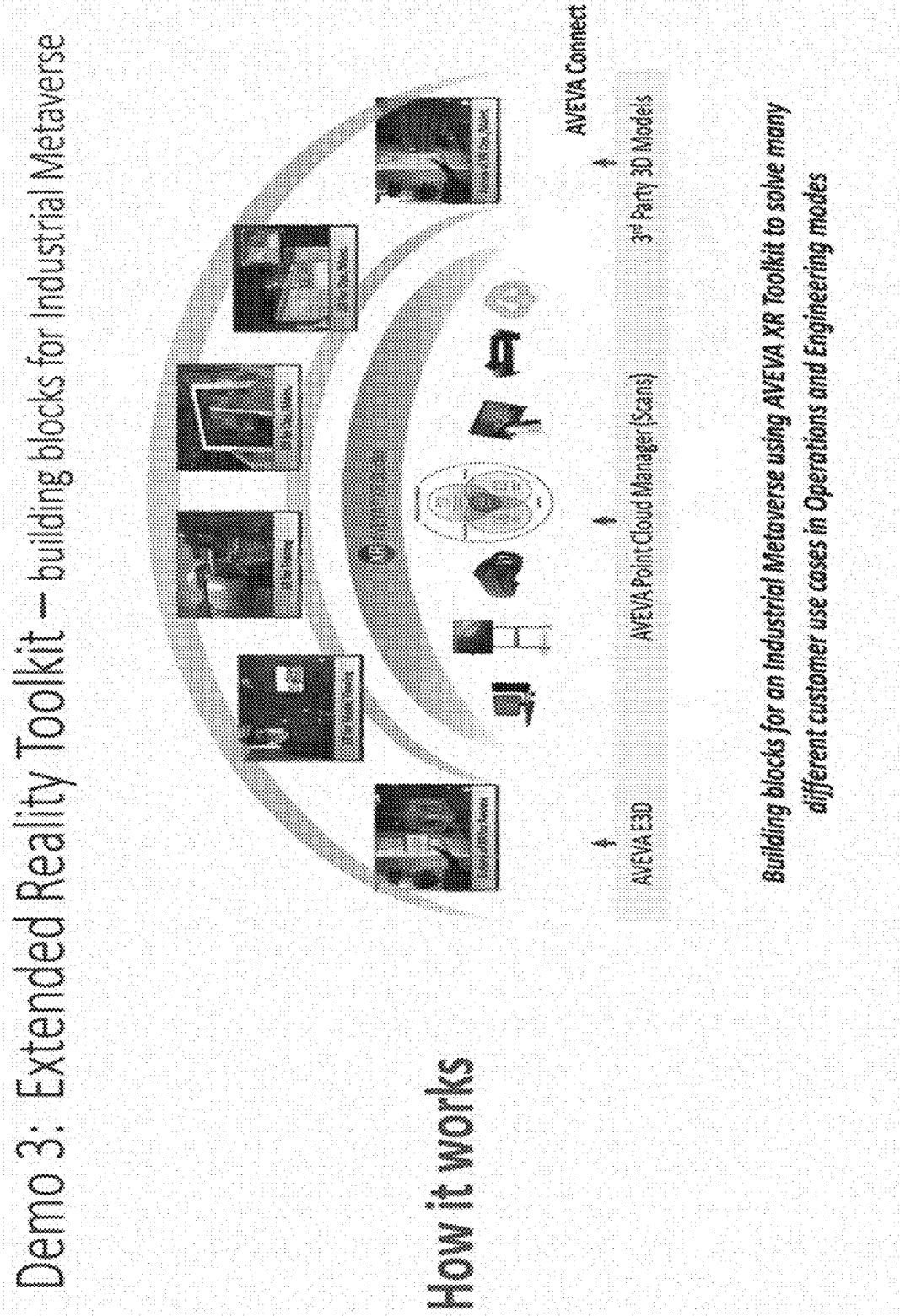
FIG. 5 depicts one or more system module integrations from AVEVA XR Toolkit according to some embodiments.

In some embodiments, the system is integrated with one or more extended reality systems and is configured to enable Augmented Reality (AR), Virtual Reality (VR), and Mixed Reality (MR) environments. In some embodiments, a non-limiting example of an extended reality system includes AVEVA XR Toolkit. FIG. 5 depicts one or more system module integrations from AVEVA XR Toolkit according to some embodiments.

Figure 6:
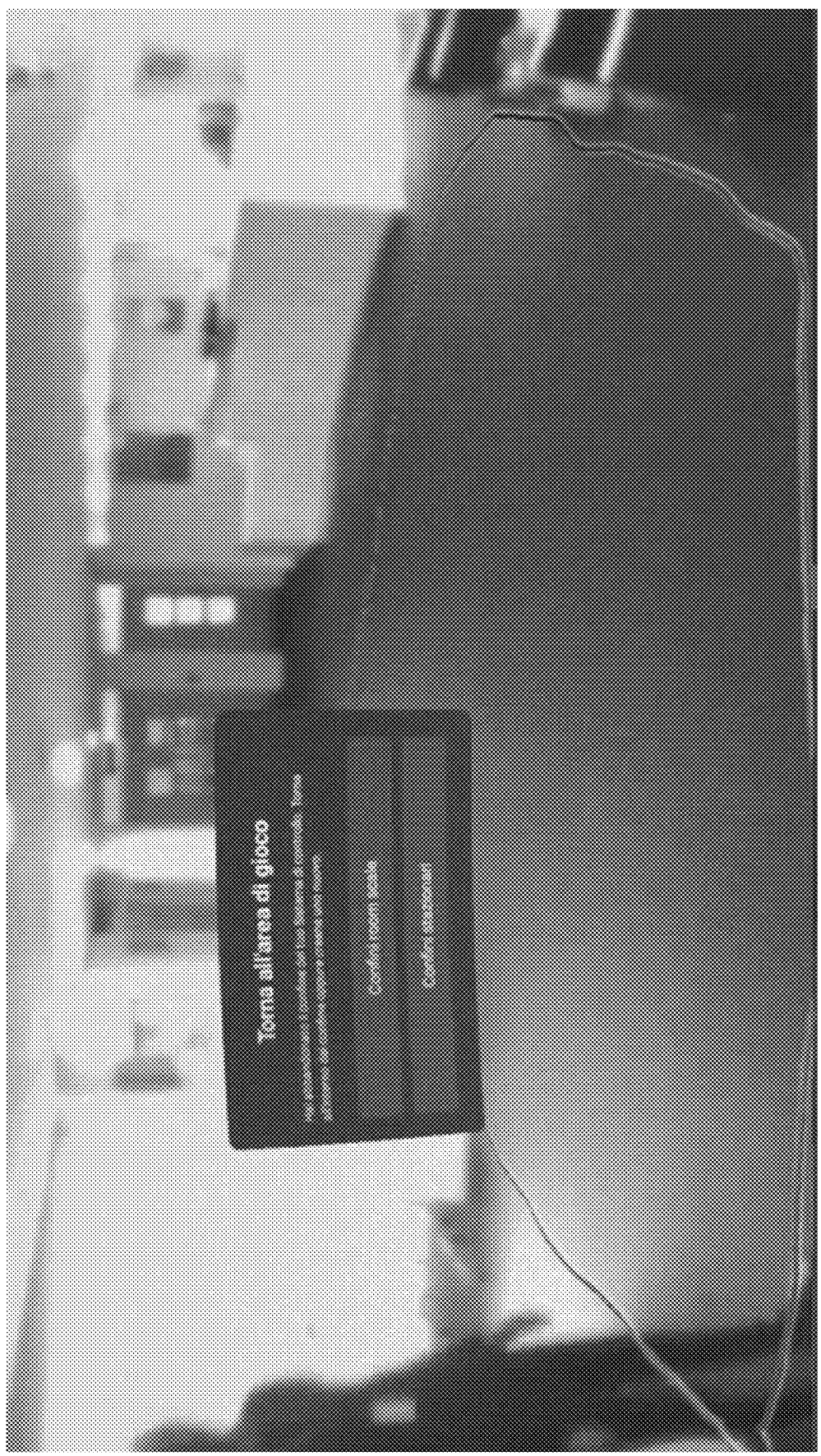
FIG. 6 shows an initial startup of the system according to some embodiments. In some embodiments, the visual display is configured to enable the user to see at least a portion of their proximate environment on the display.

FIG. 6 shows an initial startup of the system according to some embodiments. In some embodiments, the visual display is configured to enable the user to see at least a portion of their proximate environment on the display. In some embodiments, the system is configured to enable a user to define a boundary for the virtual environment within the displayed proximate environment. Such boundaries can help ensure user safety.

Figure 7:
FIG. 7 shows a user passing through the boundary according to some embodiments.
Figure 8:
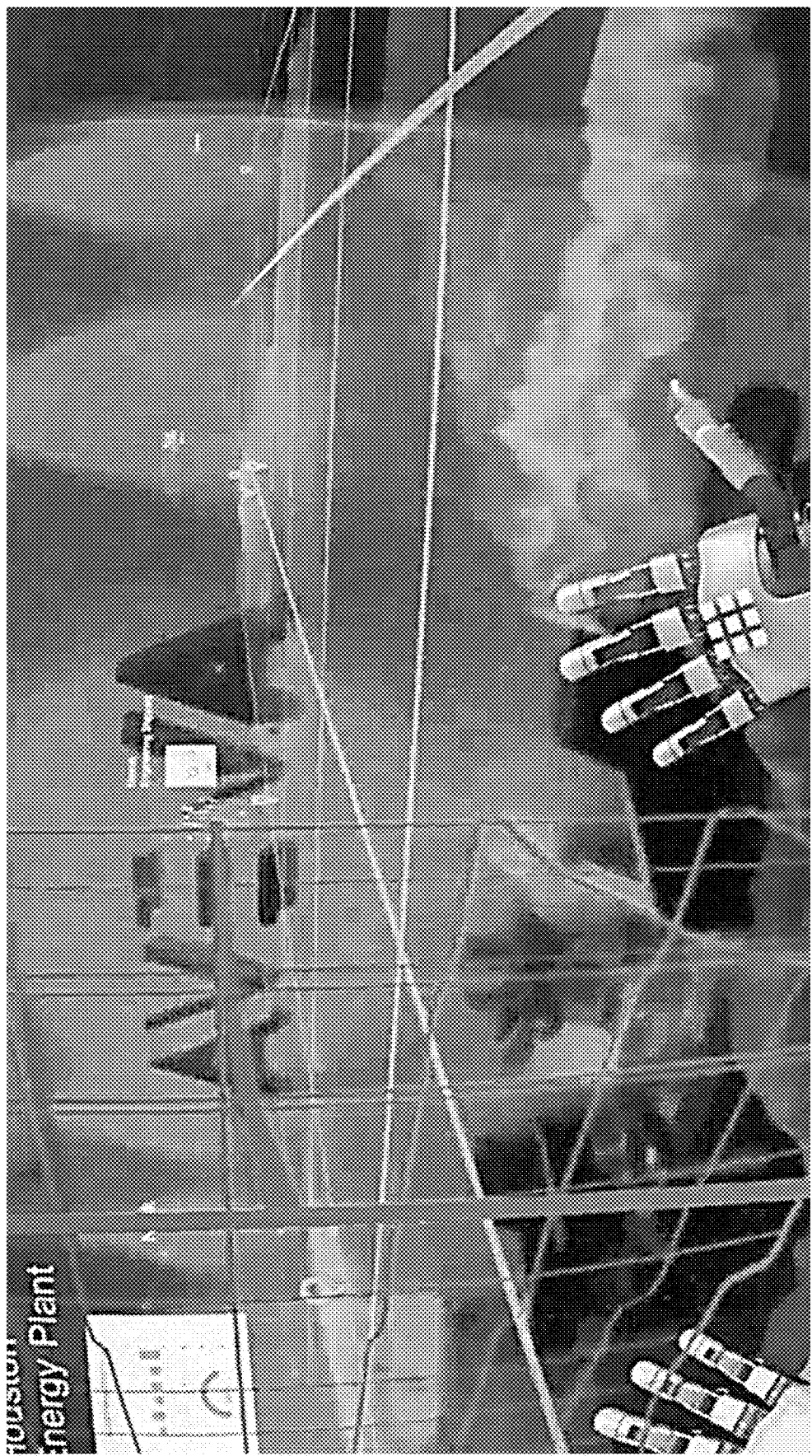
FIG. 8 illustrates a transition view where at least a portion of both the proximate environment and the virtual environment are displayed simultaneously according to some embodiments.

FIG. 7 shows a user passing through the boundary according to some embodiments. FIG. 8 illustrates a transition view where at least a portion of both the proximate environment and the virtual environment are displayed simultaneously according to some embodiments.

Figure 9:
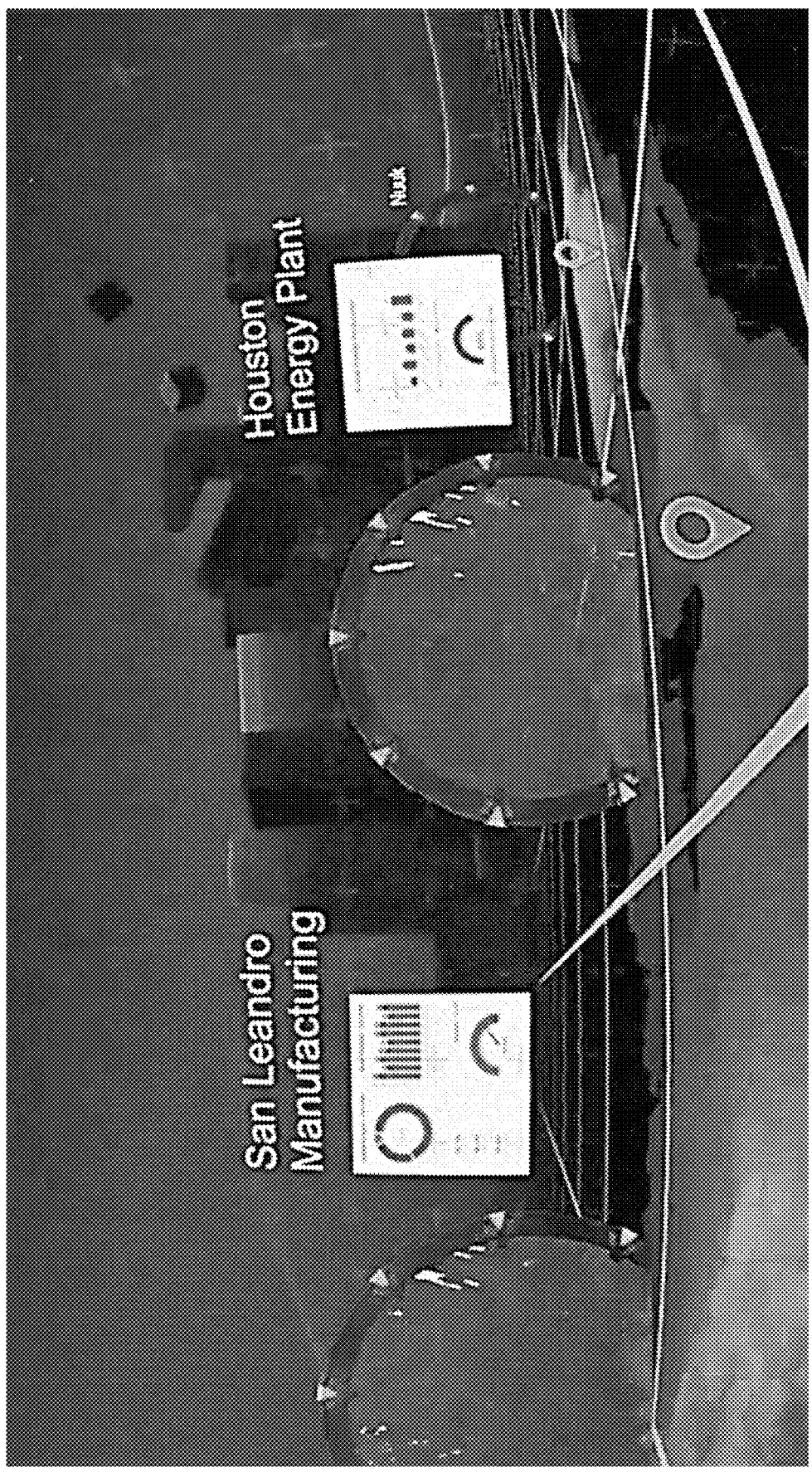
FIG. 9 shows the user completely immersed in the virtual portal environment according to some embodiments.

In some embodiments, the virtual environment includes a virtual portal environment. FIG. 9 shows the user completely immersed in the virtual portal environment according to some embodiments. In some embodiments, the virtual portal environment comprises one or more portals configured to transport the user to a virtual industrial environment. In some embodiments, the one or more portals are arranged by their relative positions on a real-world map. In some embodiments, the system is configured to enable a user to customize the arrangement of the one or more portals within the virtual portal environment. In some embodiments, the system is configured to display one or more industrial environment summaries. In some embodiments, the system is configured to display one or more analysis displays displaying one or more industrial environment summaries adjacent to the one or more portals. In some embodiments, the system is configured to enable a user to customize one more industrial environment summaries. In some embodiments, the one or more industrial environment summaries include one or more analyses using one or more integrated systems described herein.

Figure 10:
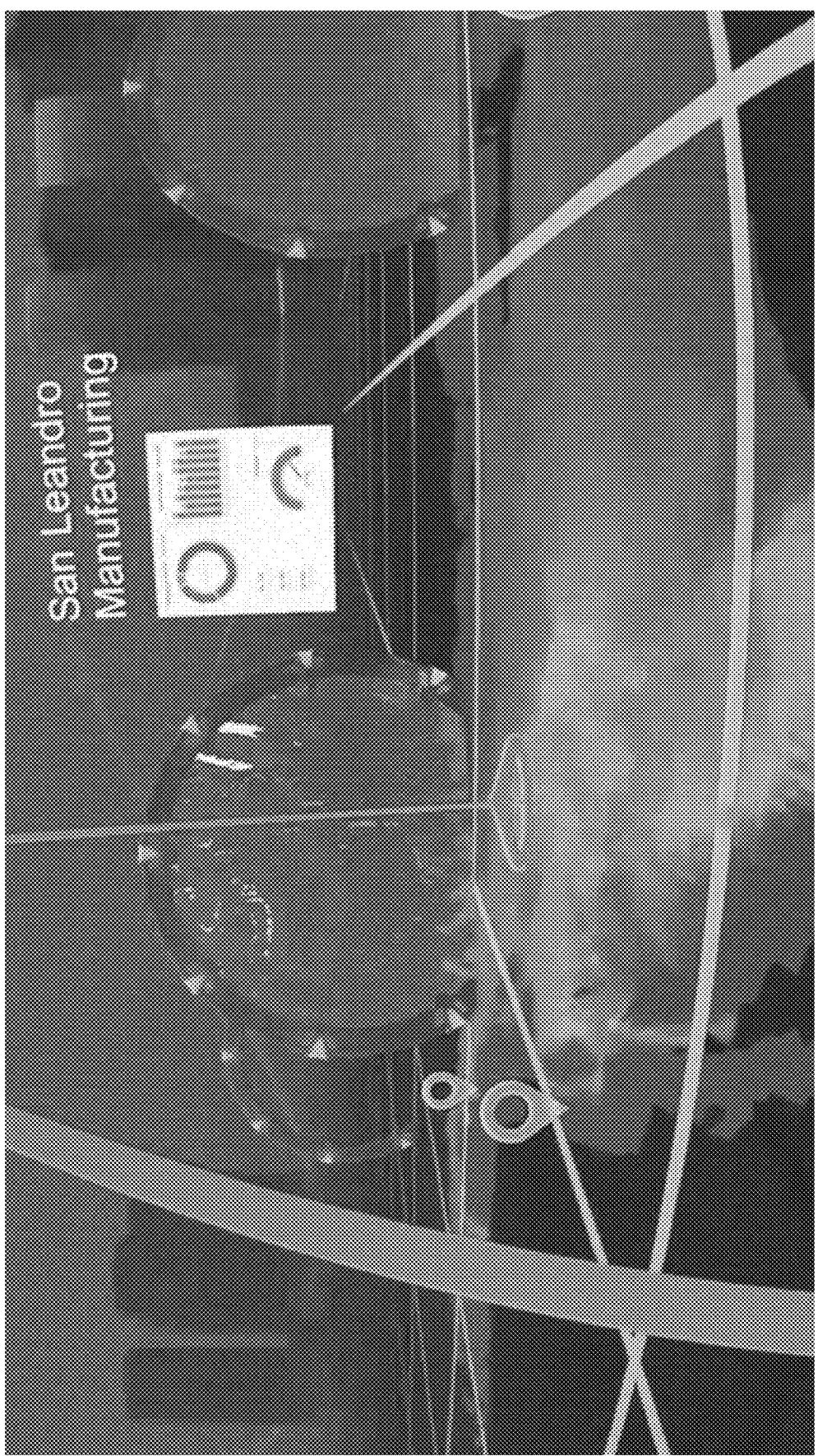
FIG. 10 shows a teleportation feature enabled by the system according to some embodiments.

FIG. 10 shows a teleportation feature enabled by the system according to some embodiments. In some embodiments, the system is configured to enable a user to move through a virtual environment by physically moving through the proximate environment. In some embodiments, the system is configured to enable a user to move through a virtual environment by selecting a distant location, where upon confirmation the user is teleported (defined as transported across space and/or distance automatically or otherwise) to the distant location in the virtual environment. In some embodiments, a distant location includes a portal. In some embodiments, the system is configured to enable a user to teleport to a distant location by selecting the location on a menu.

Figure 11:
FIG. 11 illustrates a view in the virtual environment where the user is next to an industrial environment summary.

FIG. 11 illustrates a view in the virtual environment where the user is next to an industrial environment summary. In some embodiments, the system is configured to scale one or more industrial environment summaries as the user approaches and/or retreats. In some embodiments, the system is configured to change a perspective angle of one or more industrial environment summaries to correspond with a real world view and/or real world change in perspective.

Figure 12:
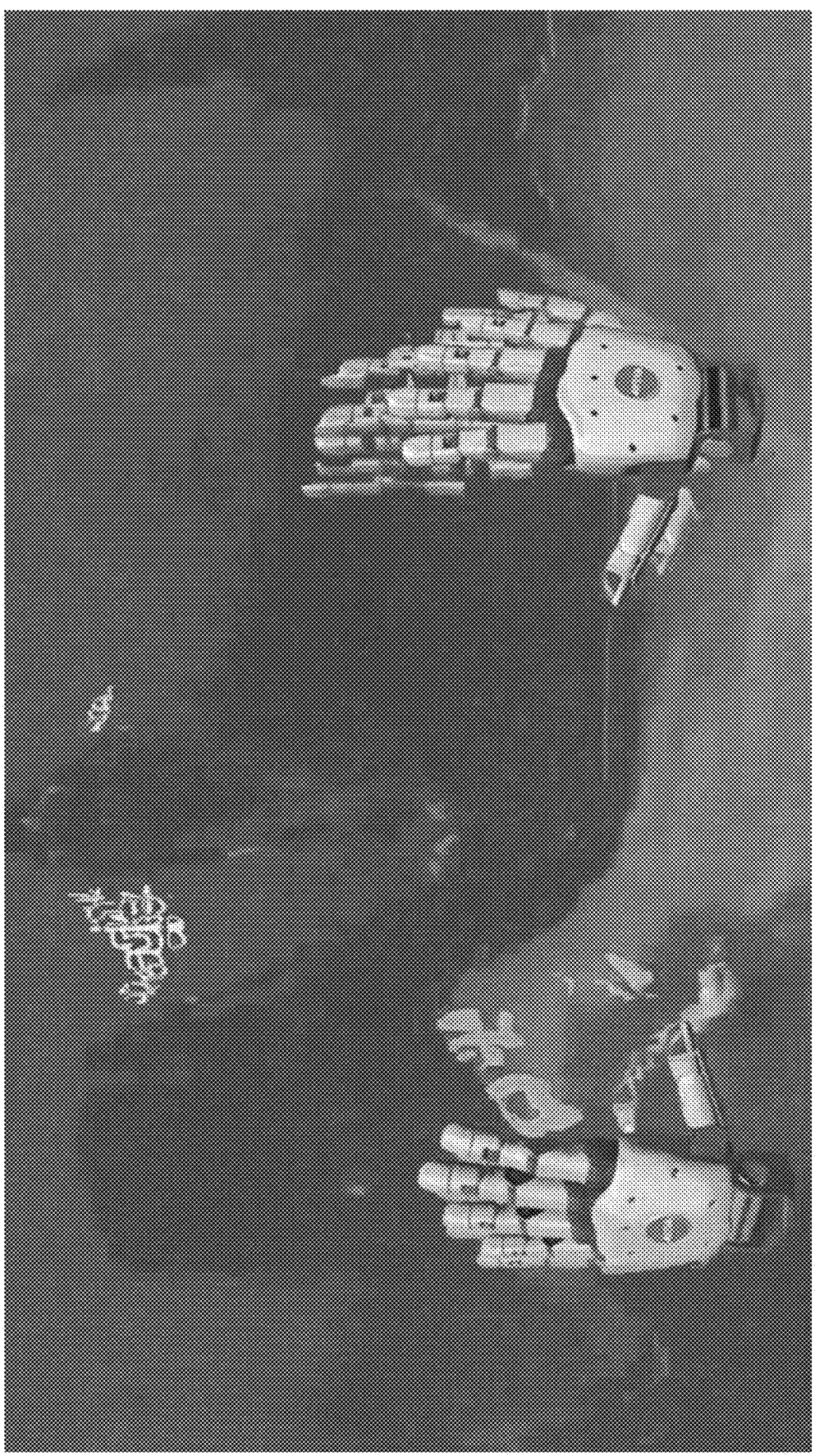
FIG. 12 shows the user passing through a portal as well as the user's virtual controllers, which are virtual representation of the two physical controllers in the real world according to some embodiments.
Figure 13:
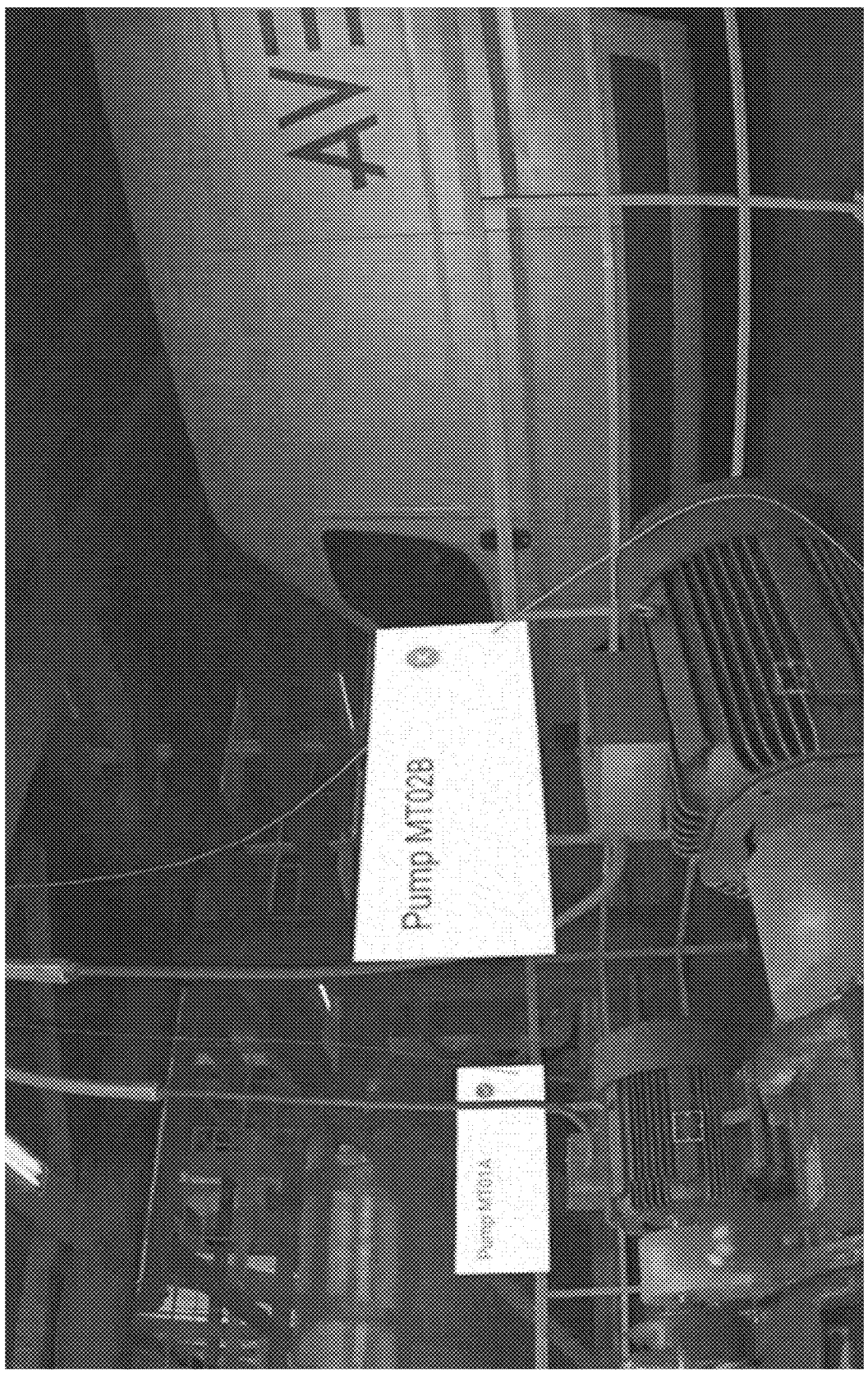
FIG. 13 depicts the user in a first virtual industrial environment within the virtual environment after passing through a first portal according to some embodiments.

FIG. 12 shows the user passing through a portal and also shows the user's virtual controllers, which are virtual representation of the two physical controllers in the real world according to some embodiments. FIG. 13 depicts the user in a first virtual industrial environment within the virtual environment after passing through a first portal according to some embodiments. In some embodiments, the virtual industrial environment includes a digital twin of one or more components in a corresponding physical industrial environment. In some embodiments, the system is configured to associate the data collected from the one or more components by one or more integrated systems and/or analyzed by one or more integrated systems with each of the one or more industrial components, and display the associated and/or analyzed data to a user via an analysis display. In this non-limiting example, the one or more components include two pumps according to some embodiments.

Figure 14:
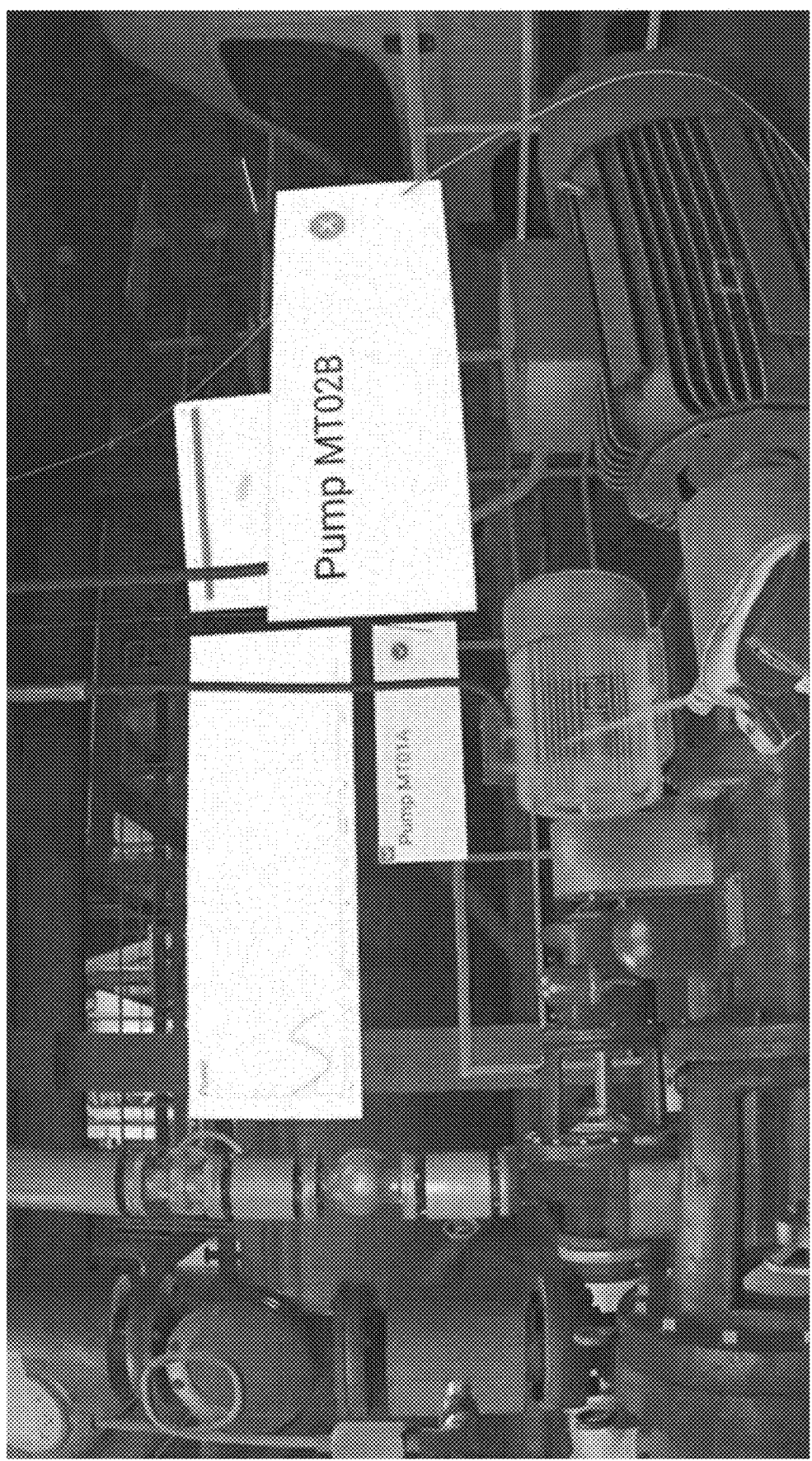
FIG. 14 illustrates a user selecting a first component (pump MT01A) according to some embodiments.
Figure 15:
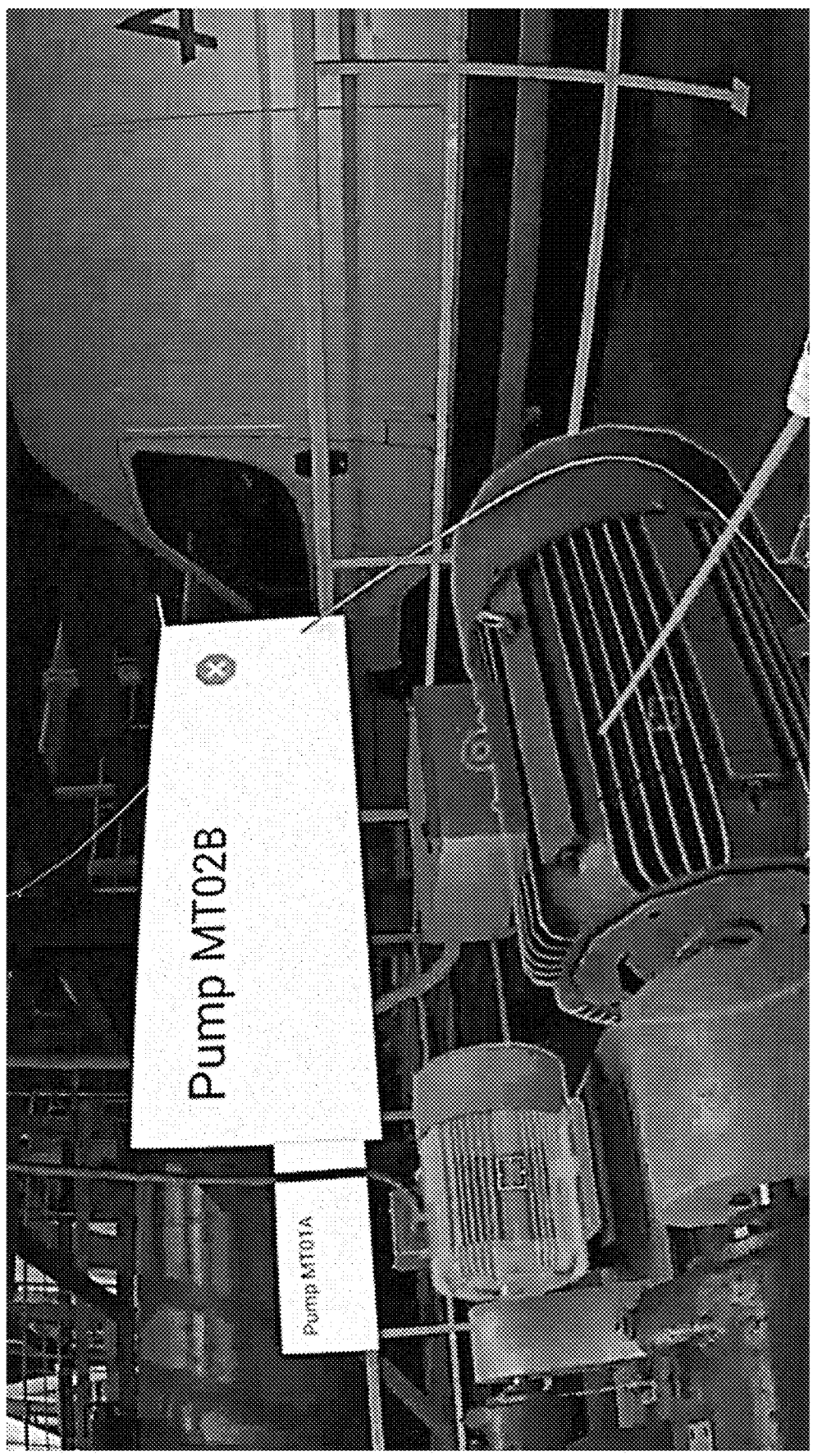
FIG. 15 shows a full highlight for a selected component, and a partial highlight for a second identified component according to some embodiments.
Figure 16:
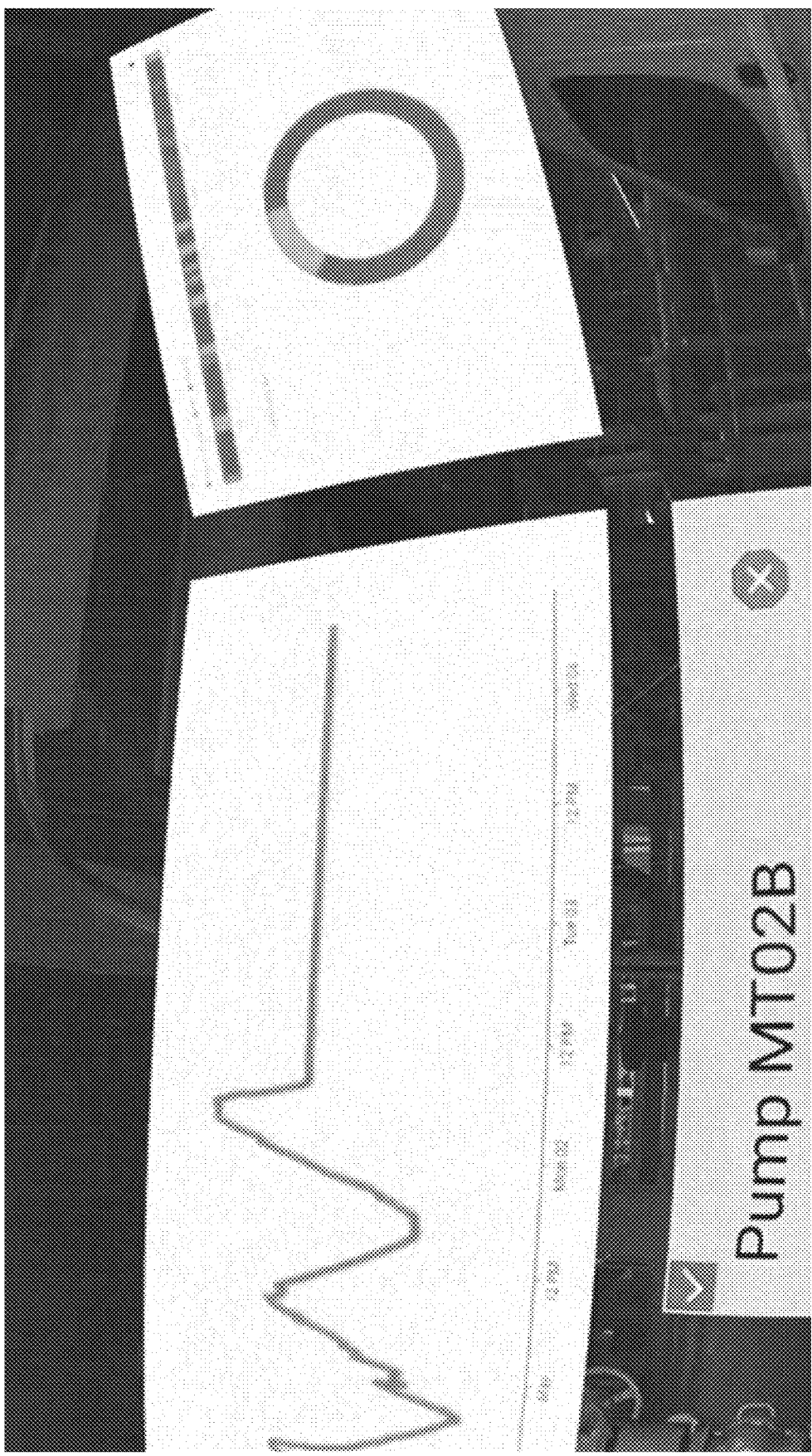
FIG. 16 depicts an analysis display in the first virtual industrial environment according to some embodiments.

FIG. 14 illustrates a user selecting a first component (pump MT01A) according to some embodiments. In some embodiments, the system is configured to enable a user to select one or more components using one or more virtual controllers according to some embodiments. In some embodiments, the system is configured to highlight the one or more selected components. FIG. 15 shows a full highlight for a selected component, and a partial highlight for a second identified component according to some embodiments. In some embodiments, the system is configured to enable a user to generate one or more analysis displays within the virtual environment. In some embodiments, the system is configured to enable a user to position an analysis display anywhere in the virtual environment. In some embodiments, the system is configured to enable a user to generate and/or remove an analysis display upon selection of an identified and/or selected component. FIG. 16 depicts an analysis display in the first virtual industrial environment according to some embodiments.

Figure 17:
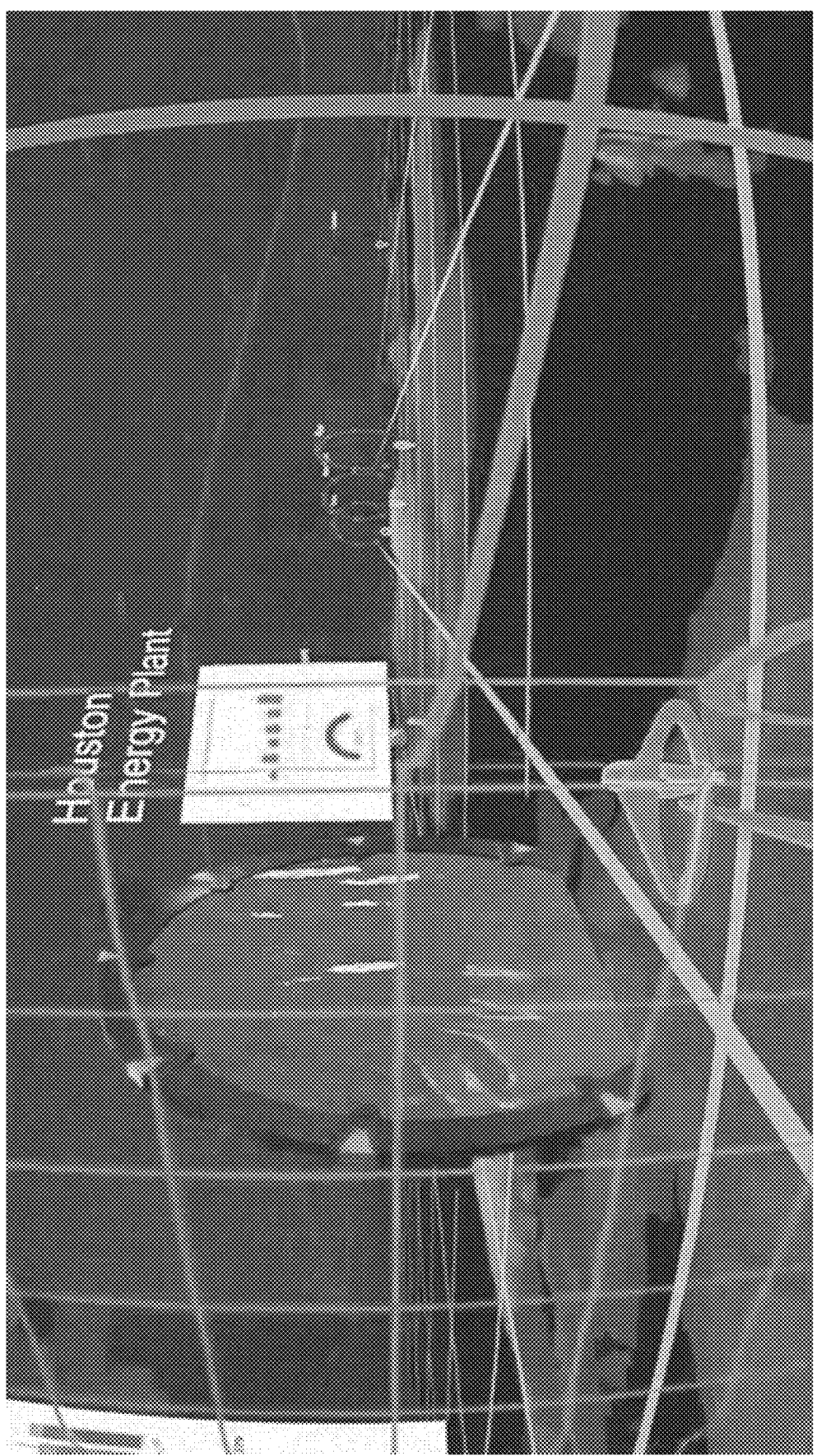
FIG. 17 shows the user teleporting to a second virtual industrial environment portal according to some embodiments.
Figure 18:
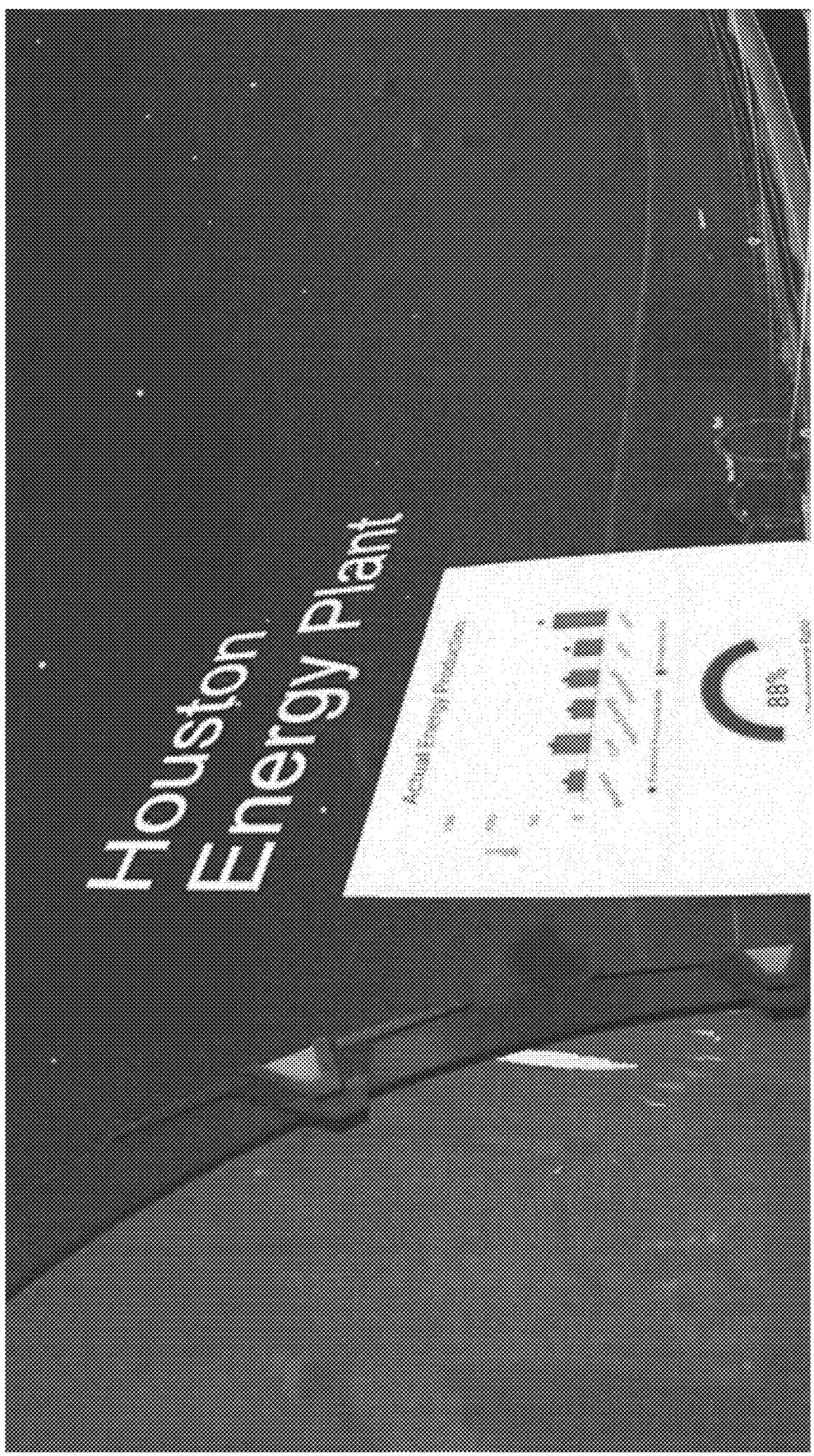
FIG. 18 depicts an analysis window in the form of an industrial environment summary adjacent a second portal according to some embodiments.

FIG. 17 shows the user teleporting to a second virtual industrial environment portal according to some embodiments. In some embodiments, the system is configured to alert the user when at least a portion of the virtual display is outside of a boundary. In some embodiments, the alert includes the generation of a boundary grid and/or a transition to a proximate environment view according to some embodiments. FIG. 18 depicts an analysis window in the form of an industrial environment summary adjacent a second portal according to some embodiments.

Figure 19:
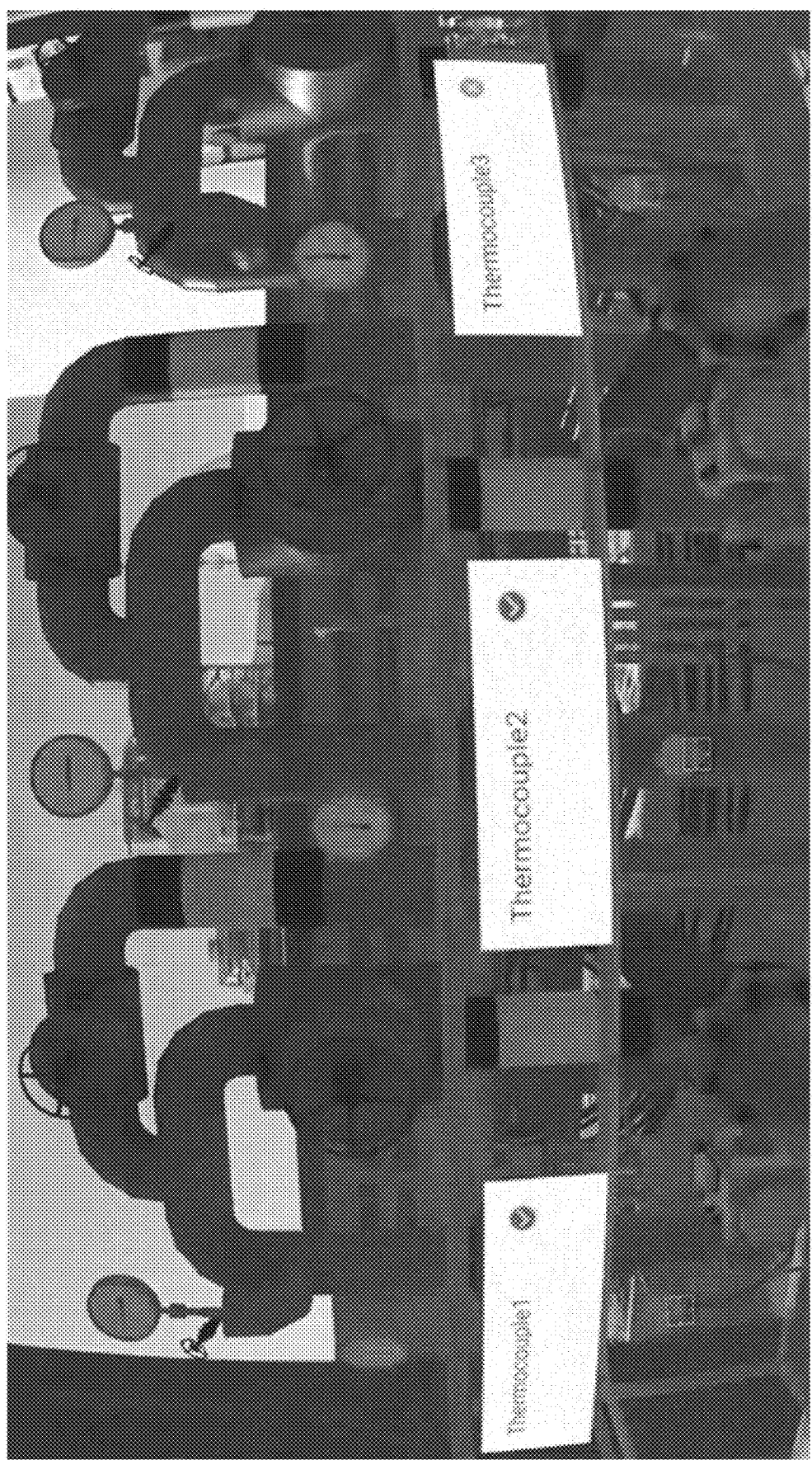
FIG. 19 illustrates a second virtual industrial environment generated by the system after the user passes through the second portal according to some embodiments.

FIG. 19 illustrates a second virtual industrial environment generated by the system after the user passes through the second portal according to some embodiments. In some embodiments, the system includes a camera configured to capture one or more images from a physical industrial environment. In some embodiments, the system is configured to determine one or more component dimensions from the one or more captured images. In some embodiments, the system is configured to generate the virtual industrial environment from the one or more images. In some embodiments, the camera includes a scanner. The second virtual industrial environment illustrated in FIG. 19 was generated via images captured by a laser scanner according to some embodiments.

In some embodiments, the system is configured to generate real world environmental conditions within the virtual environment. Some non-limiting examples of real world conditions include rain, clouds, snow, and sun position according to some embodiments. In some embodiments, the system is configured display environmental conditions on one or more analysis displays.

In some embodiments, the system is configured to continuously and/or intermittently record one or more aspects of the physical industrial environment. In some embodiments, the system is configured to store the recordings in one or more databases such as a historian database according to some embodiments. In some embodiments, the system is configured to only store changes in the physical industrial environment. In some embodiments, the system is configured to use AI (e.g., AVEVA Vision AI) to determine changes in the physical industrial environment. In some embodiments, by only storing the changes in the physical industrial environment, valuable computer storage resources are conserved.

Figure 20:
FIG. 20 shows the position of the sun at a moment in time according to some embodiments.

In some embodiments, the system is configured to integrate a change in the physical environment into a virtual environment as a component, image, and/or video. In some embodiments, the system is configured to combine the changes in the environment with the static components that have not changed in response to a query and/or request by a user. In some embodiments, the query is for a specific time frame. In some embodiments, the time frame is in the past. Advantageously, by recreating the physical industrial environment during a period of interest in a virtual environment, in some embodiments, the system is configured to enable a user to "travel through time" and witness from a present perspective past environmental factors integrated into the virtual environment by one or more systems described herein. FIG. 20 shows the position of the sun at a moment in time according to some embodiments.

Figure 21:
FIG. 21 shows a time series graph for a selected thermocouple in the second virtual industrial environment according to some embodiments.

As a non-limiting example, in some embodiments, a change in the environment may include a person manipulating a component. In some embodiments, this manipulation may have not been reported by the person, yet the system enables a user to witness their existence in the past in a present perspective. In some embodiments, the system is configured to enable a person to fast-forward, rewind, play, and pause virtual time while in the virtual environment. In some embodiments, this enables a user to witness multiple physical industrial environmental changes in a fraction of real time. In some embodiments, the system is configured to correlate a time-series graph in an analysis display with changes generated in the virtual environment. FIG. 21 shows a time series graph for a selected thermocouple in the second virtual industrial environment according to some embodiments.

Figure 22:
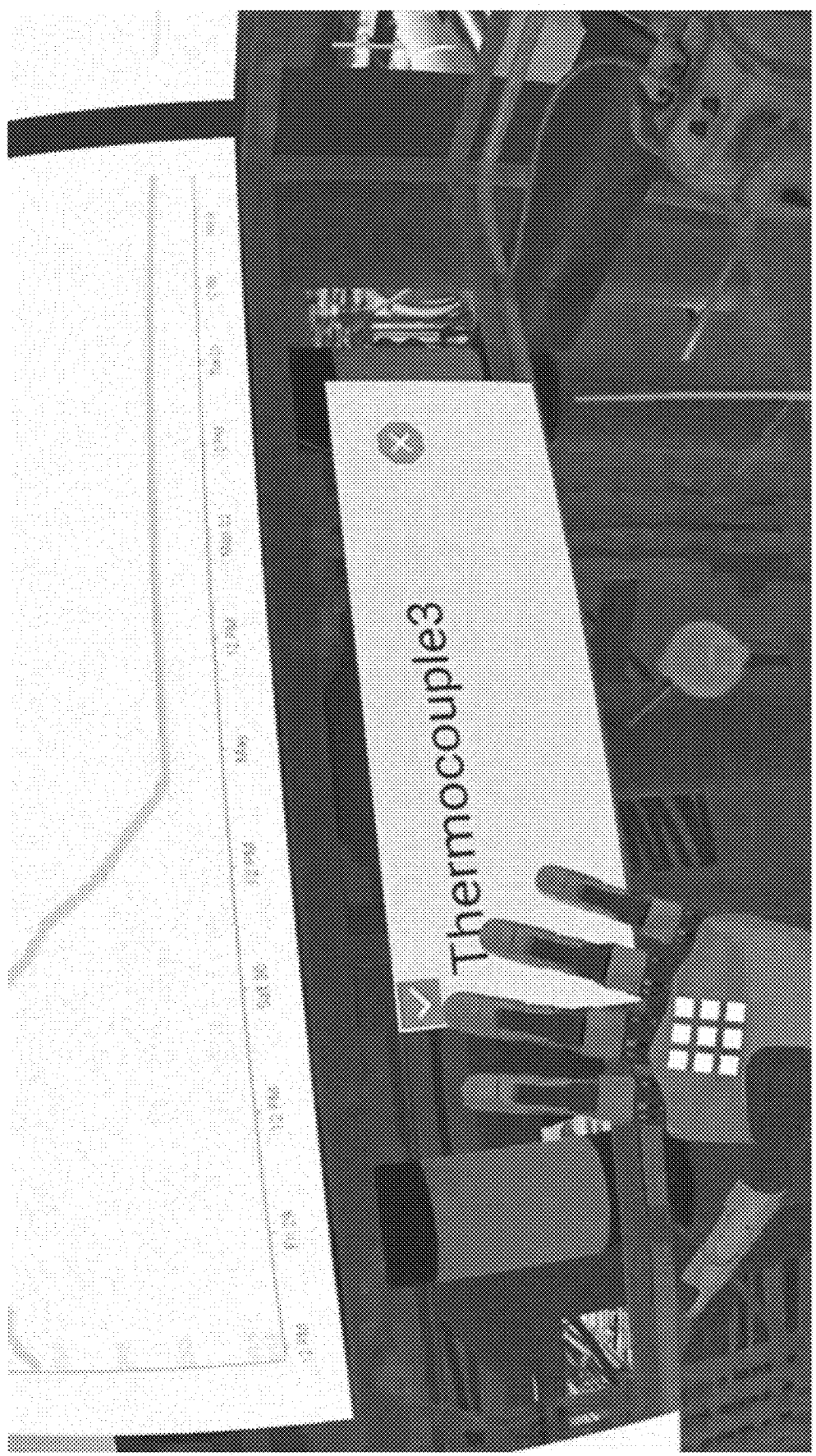
FIG. 22 depicts a controller menu generated by the system overlaid on a virtual controller according to some embodiments.
Figure 23:
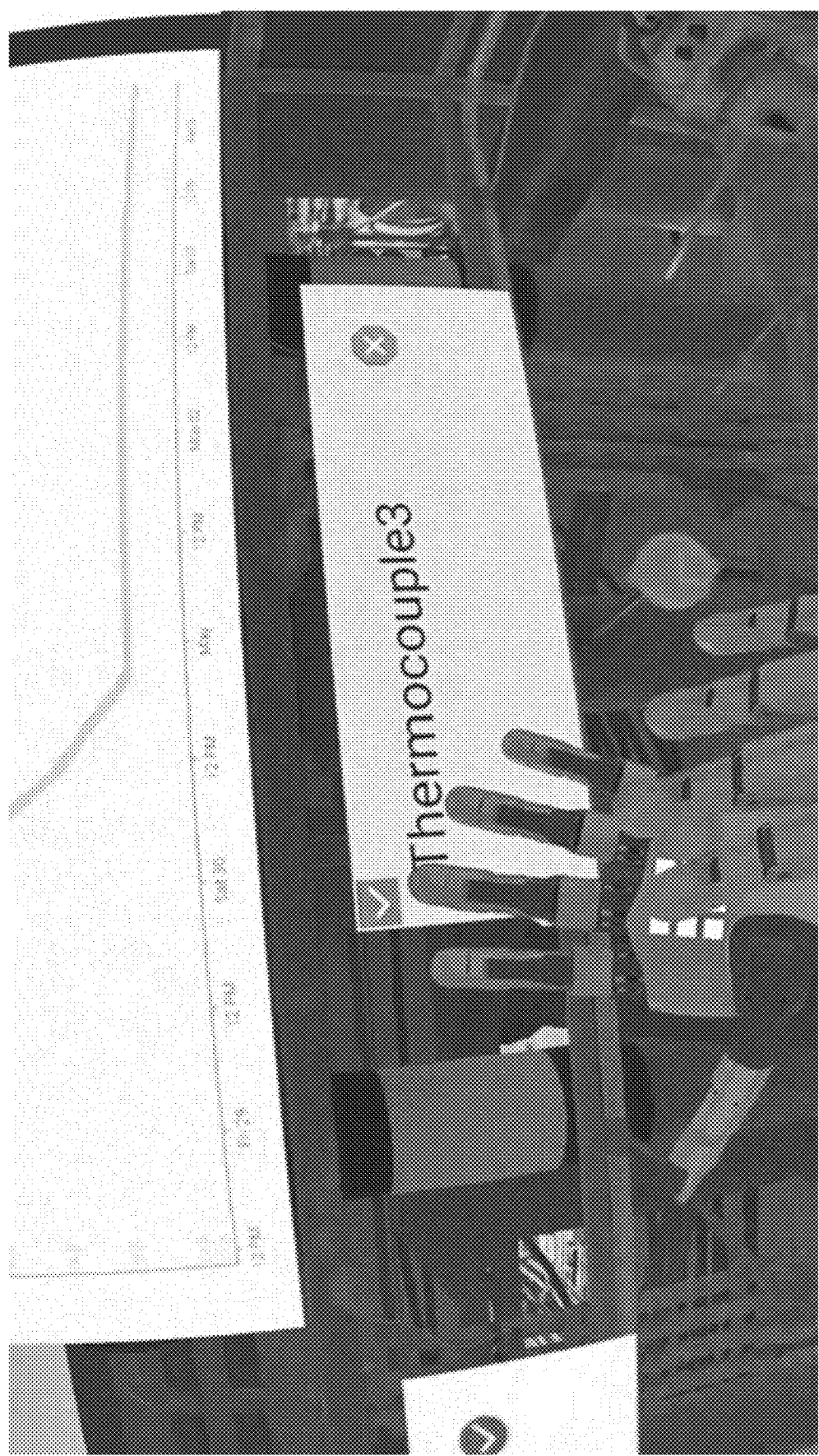
FIG. 23 show a user selecting the controller menu with another virtual controller according to some embodiments.

FIG. 22 depicts a controller menu generated by the system overlaid on a virtual controller according to some embodiments. FIG. 23 shows a user selecting the controller menu with another virtual controller according to some embodiments. In some embodiments, by overlaying the controller menu on a virtual controller, the user is able to access the menu simply by looking at the virtual controller.

Figure 24:
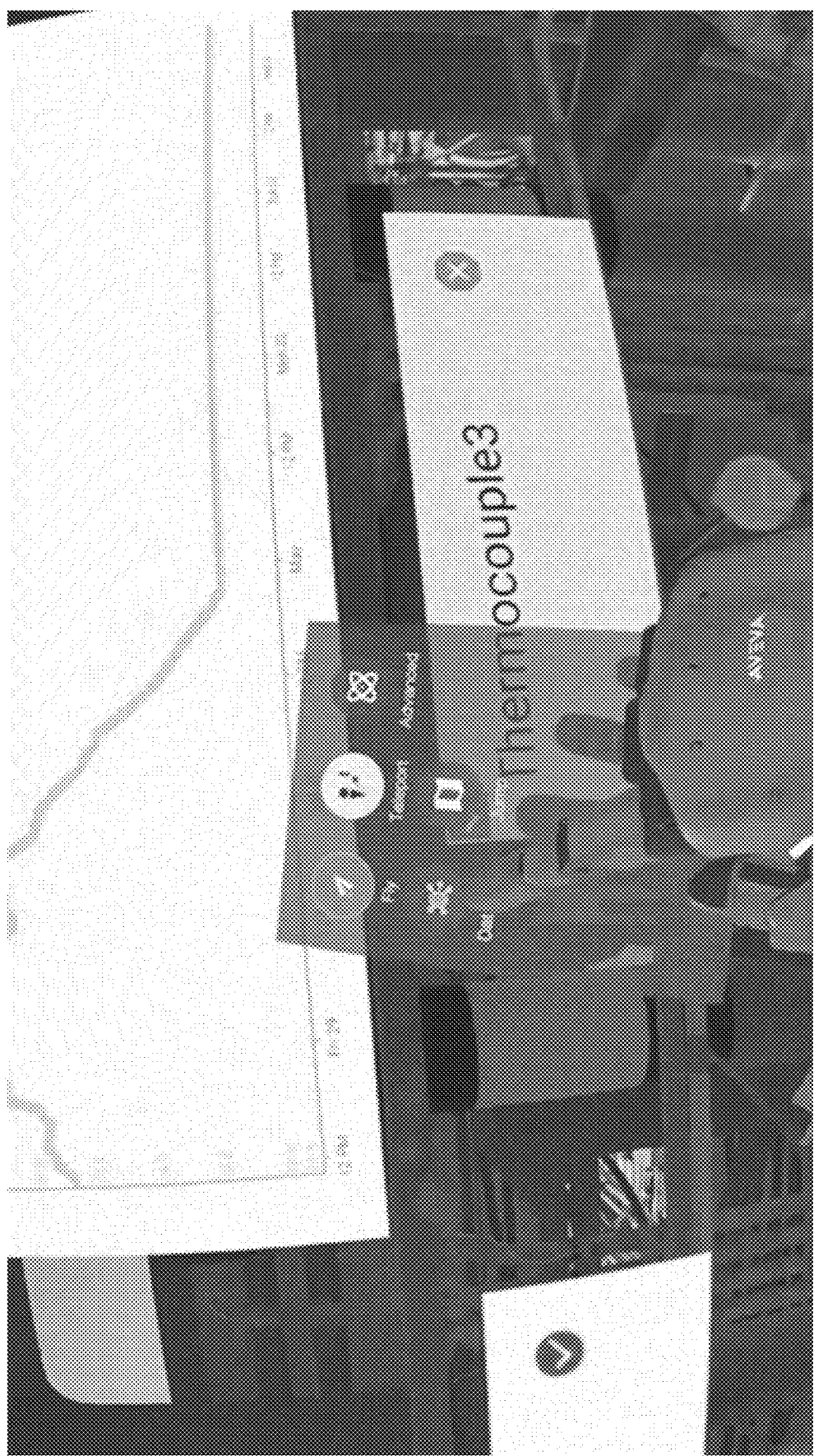
FIG. 24 illustrates a menu display generated by the system in response to selecting the controller menu according to some embodiments.
Figure 25:
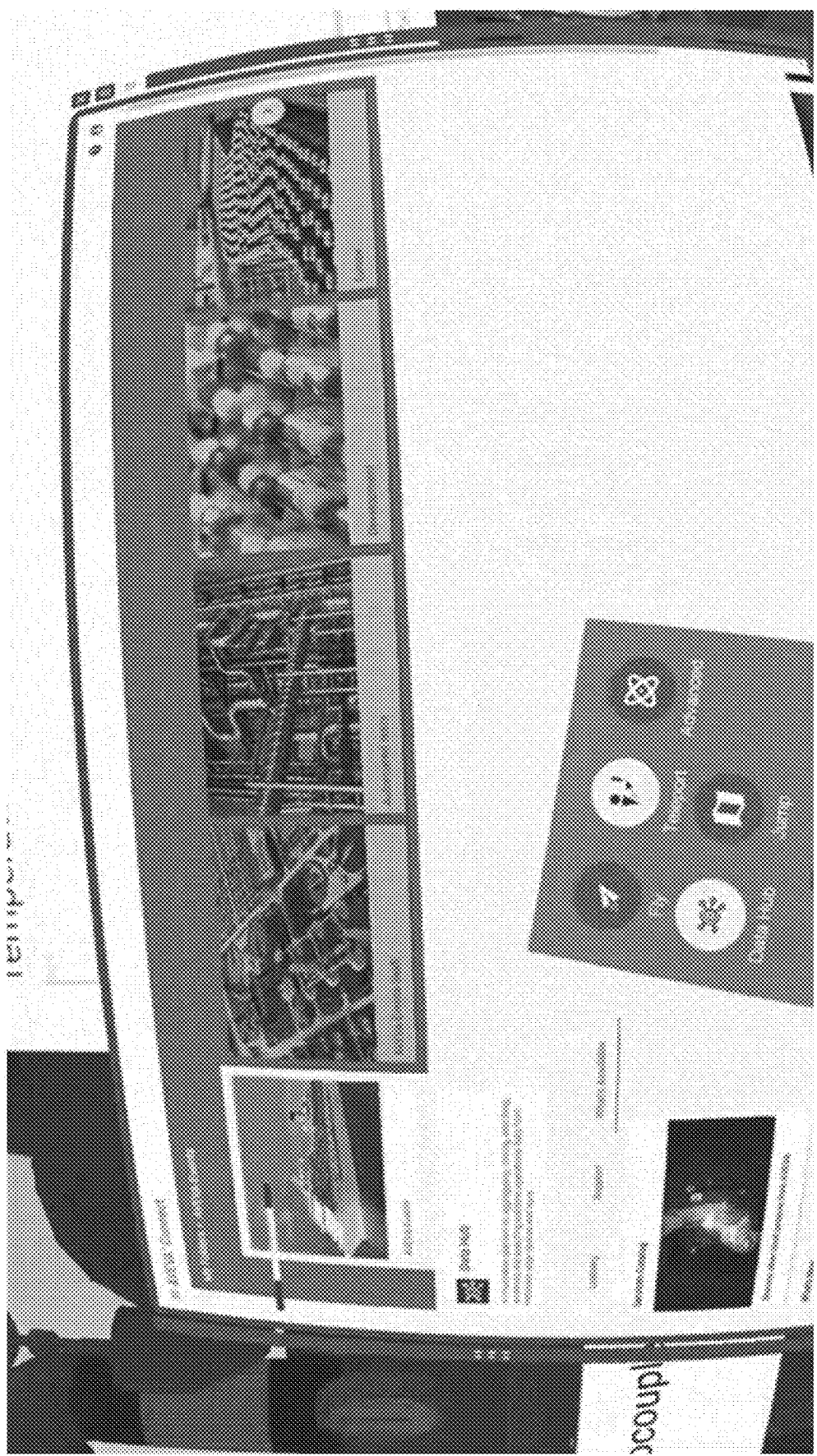
FIG. 25 illustrates an analysis display that includes a portion of Data Hub that includes AVEVA Connect, as a non-limiting example of accessing a common cloud platform according to some embodiments.
Figure 26:
FIG. 26 shows filtering by "bad" components in n virtual window (e.g., Asset Explorer window) in the analysis display according to some embodiments.

FIG. 24 illustrates a menu display generated by the system in response to selecting the controller menu according to some embodiments. In some embodiments, the controller menu includes one or more navigation options and/or one or more analysis options. FIG. 25 illustrates an analysis display that includes a portion of AVEVA Data Hub that includes AVEVA Connect, as a non-limiting example of accessing a common cloud platform providing a central location to securely access various integrated systems in a virtual environment according to some embodiments. FIG. 26 shows filtering by "bad" components in a virtual window (e.g., Asset Explorer window) in the analysis display according to some embodiments.

Figure 27:
FIG. 27 illustrates the ability to select components from a second virtual industrial environment while in a first industrial environment according to some embodiments.

In some embodiments, the system is configured to enable a user to access components from a second virtual industrial environment while in a first industrial environment. In some embodiments, this saves time and computer resources as the user does not have to exit the first virtual environment to access items in a second virtual environment. FIG. 27 illustrates the ability to select components from a second virtual industrial environment while in a first industrial environment according to some embodiments. In some embodiments, the system is configured to generate multiple analysis displays. In some embodiments, the system is configured to enable a user to display different component analysis from different virtual industrial environments while in any virtual environment according to some embodiments.

Figure 28:
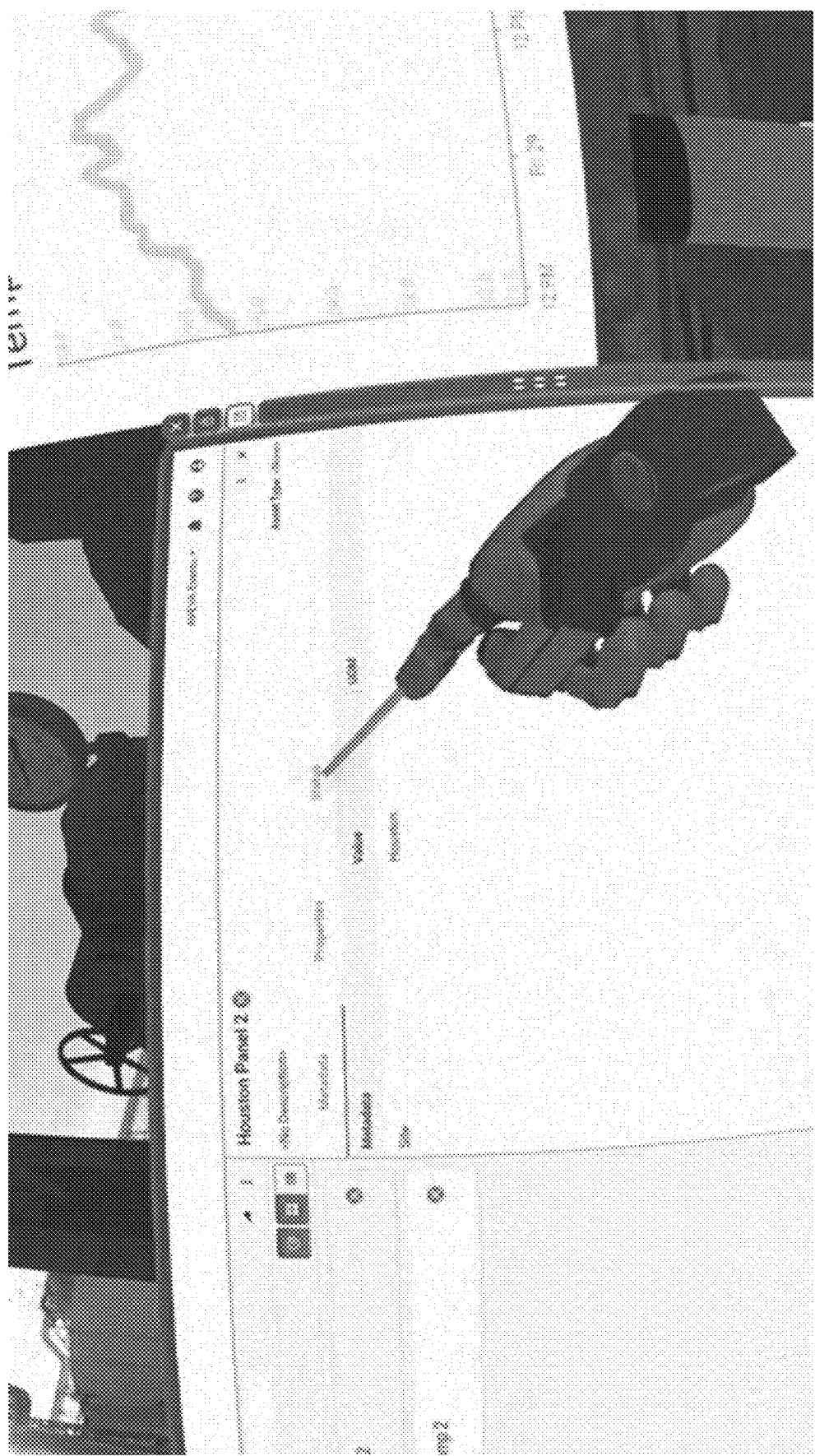
FIG. 28 depicts how the system is configured to enable a user to select a status analysis window within the virtual window according to some embodiments.
Figure 29:
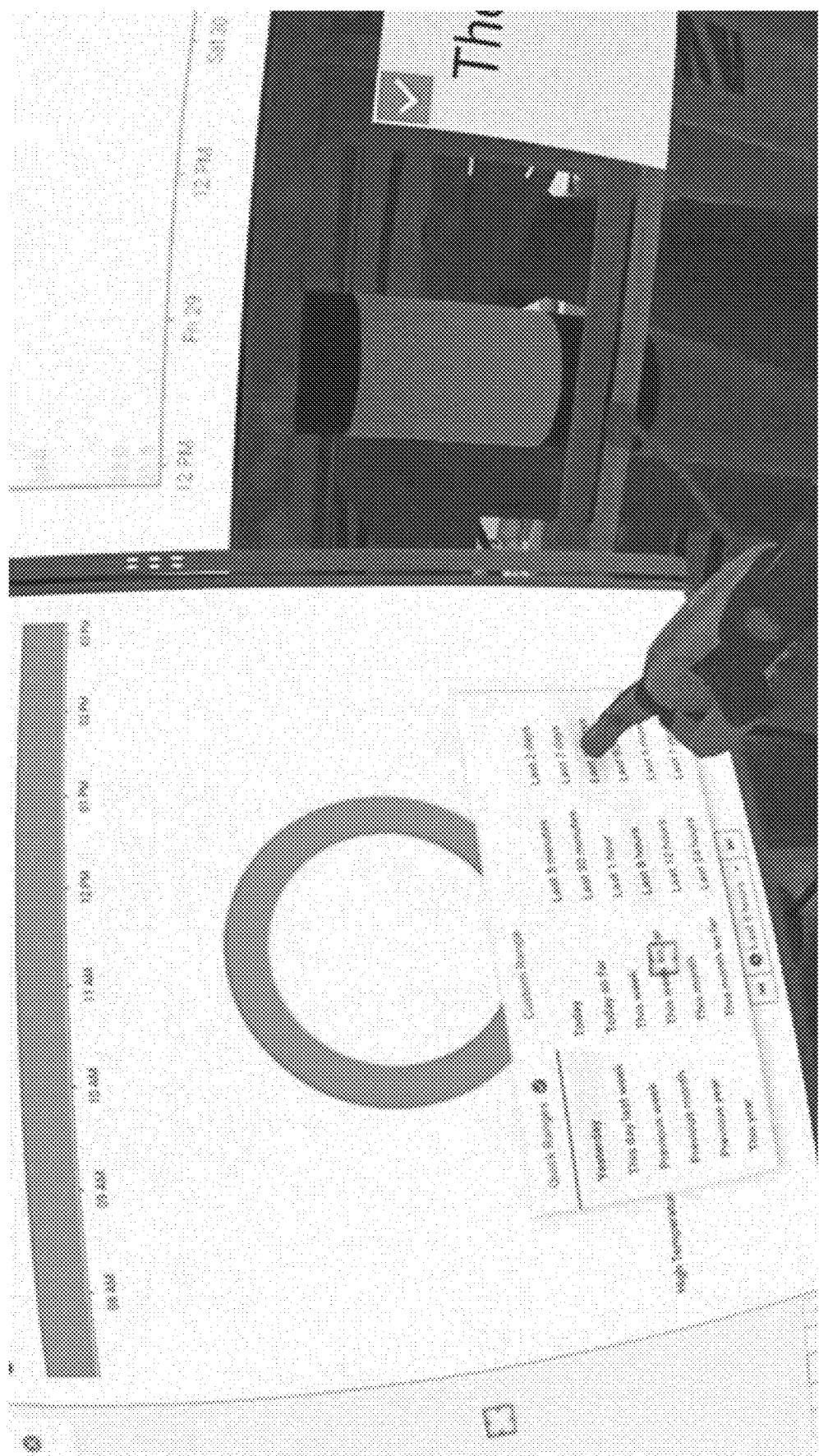
FIG. 29 shows how the system is configured to enable the user to select a time frame within the virtual window according to some embodiments.
Figure 30:
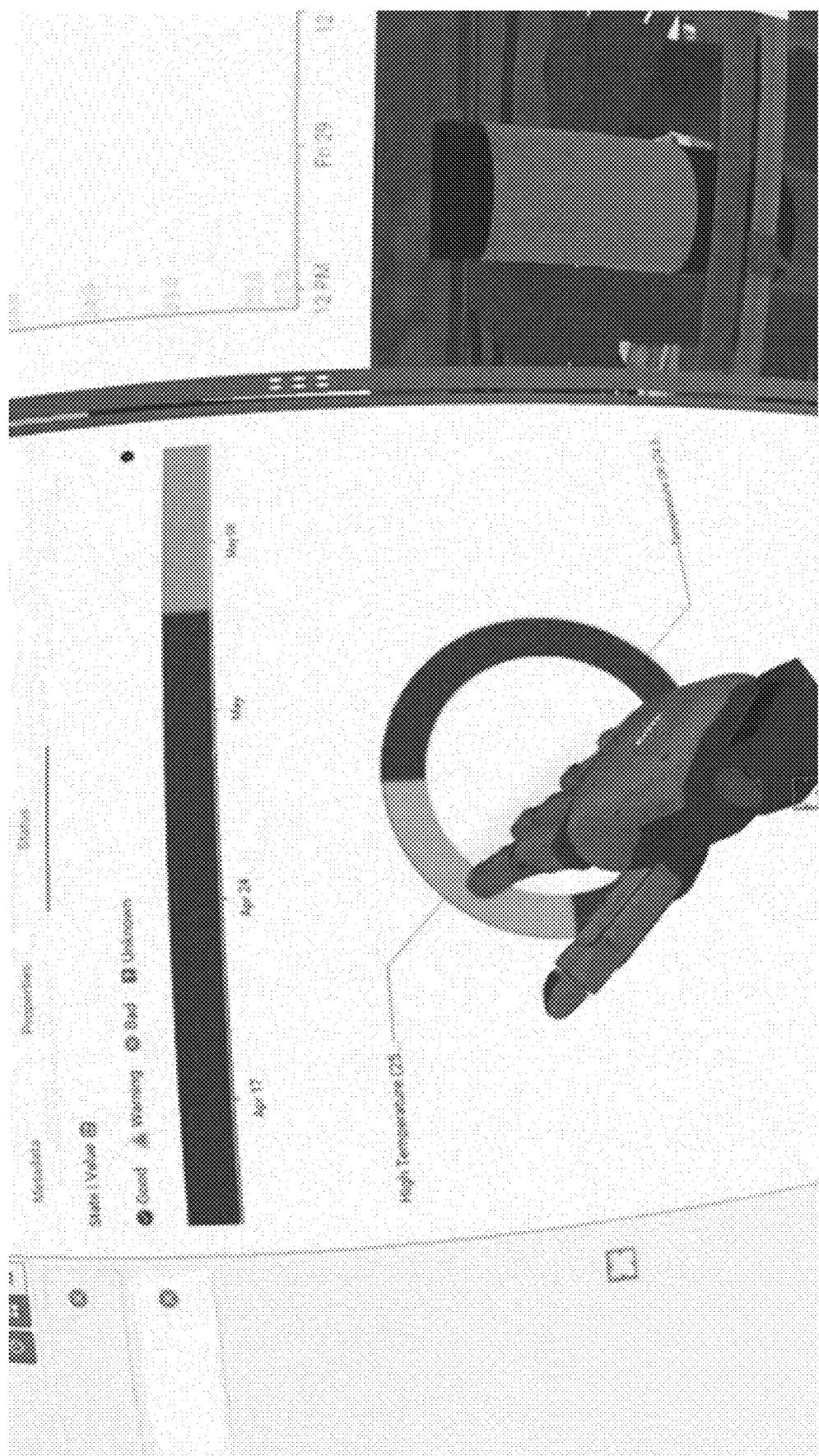
FIG. 30 depicts a user selecting a high temperature portion of a chart according to some embodiments.
Figure 31:
FIG. 31 shows the user selecting a thermocouple component in the virtual industrial environment according to some embodiments.

FIG. 28 depicts how the system is configured to enable a user to select a status analysis window within the virtual window according to some embodiments. FIG. 29 shows how the system is configured to enable the user to select a time frame within the virtual window according to some embodiments. In some embodiments, the system is configured to enable a user to select one or more analysis elements within the virtual window according to some embodiments. FIG. 30 depicts a user selecting a high temperature portion of a chart according to some embodiments. FIG. 31 shows the user selecting a thermocouple component in the virtual industrial environment according to some embodiments. In some embodiments, the system is configured to display data from a newly selected component in the same analysis display that was showing an analysis of a previously selected component. In some embodiments, the system is configured to display data from a newly selected component in a new and/or different analysis display.

Figure 32:
FIG. 32 illustrates initiating a Data Hub window according to some embodiments.
Figure 33:
FIG. 33 shows a non-limiting example of a time-series graph for thermocouple3 displayed in the same portion of Data Hub that was previously used according to some embodiments.
Figure 34:
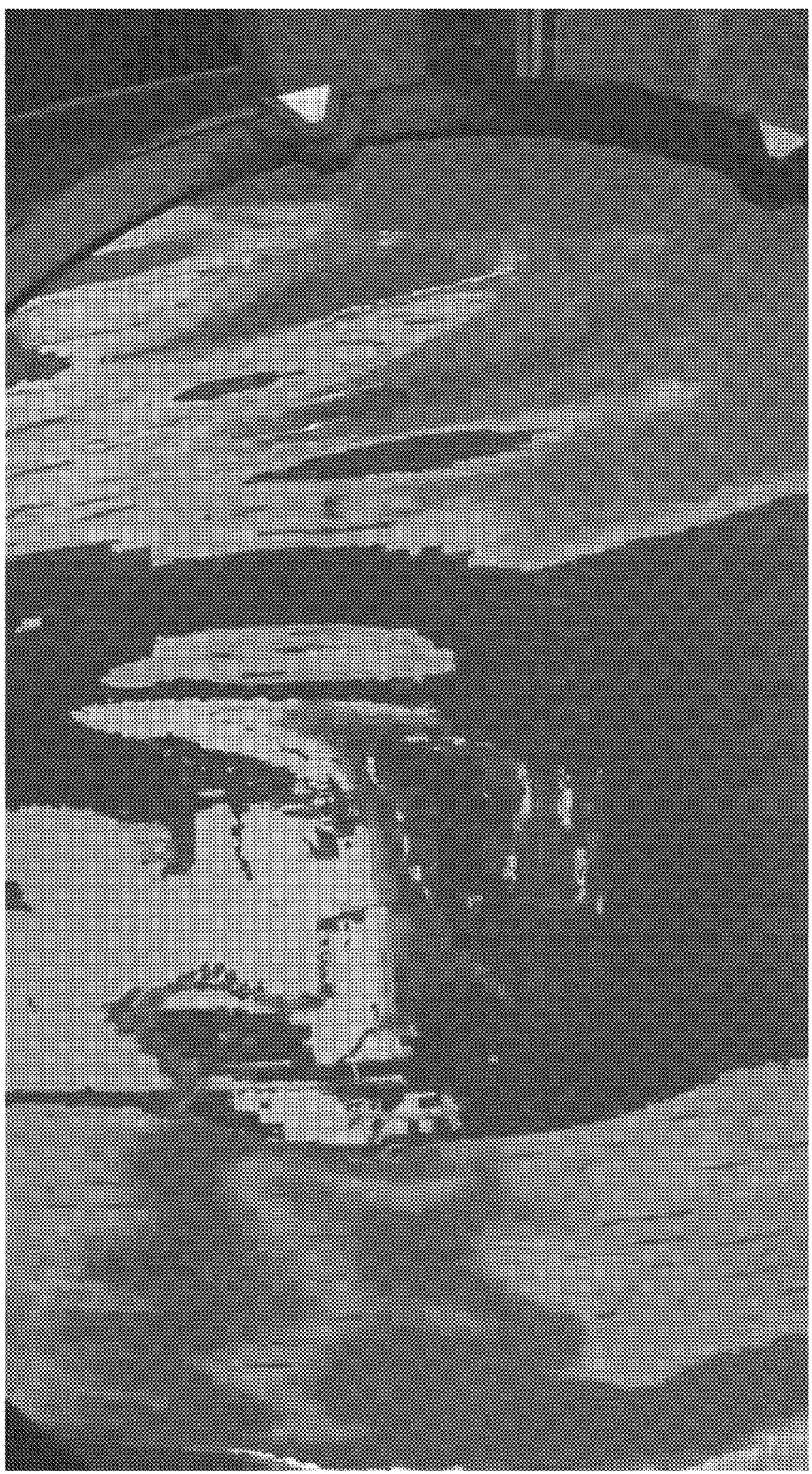
FIG. 34 shows the user leaving the virtual industrial environment through a portal according to some embodiments.

In some embodiments, the system is configured to enable a user to automatically display the integrated system in an existing or a previous analysis display in the new analysis display. FIG. 32 illustrates initiating an AVEVA Data Hub window according to some embodiments. FIG. 33 shows a non-limiting example of a time-series graph for thermocouple3 displayed in the same portion of AVEVA Data Hub that was previously used according to some embodiments. FIG. 34 shows the user leaving the virtual industrial environment through a portal according to some embodiments.

Figure 35:
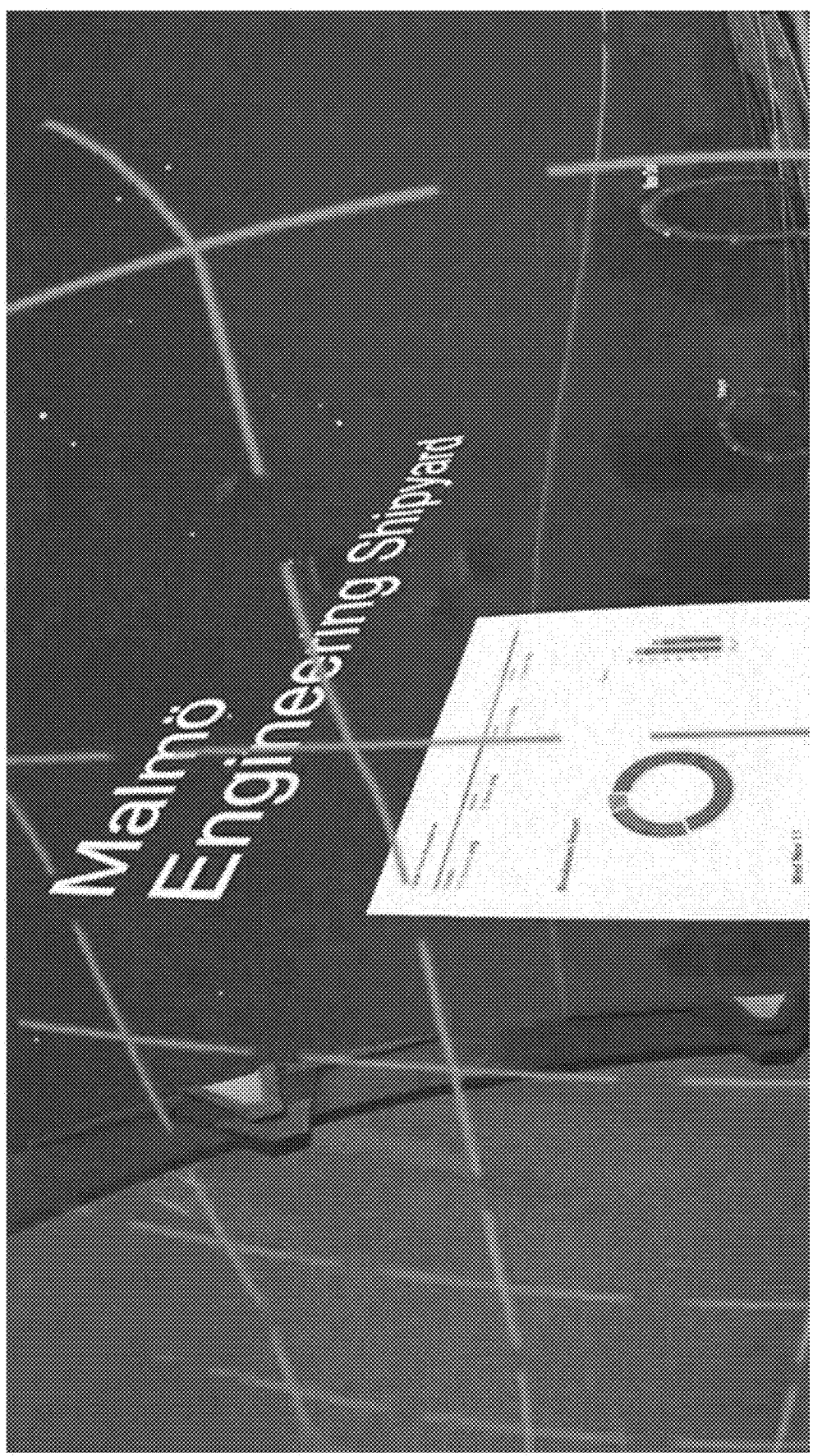
FIG. 35 illustrates the user in front of a third portal to a third virtual environment according to some embodiments.
Figure 36:
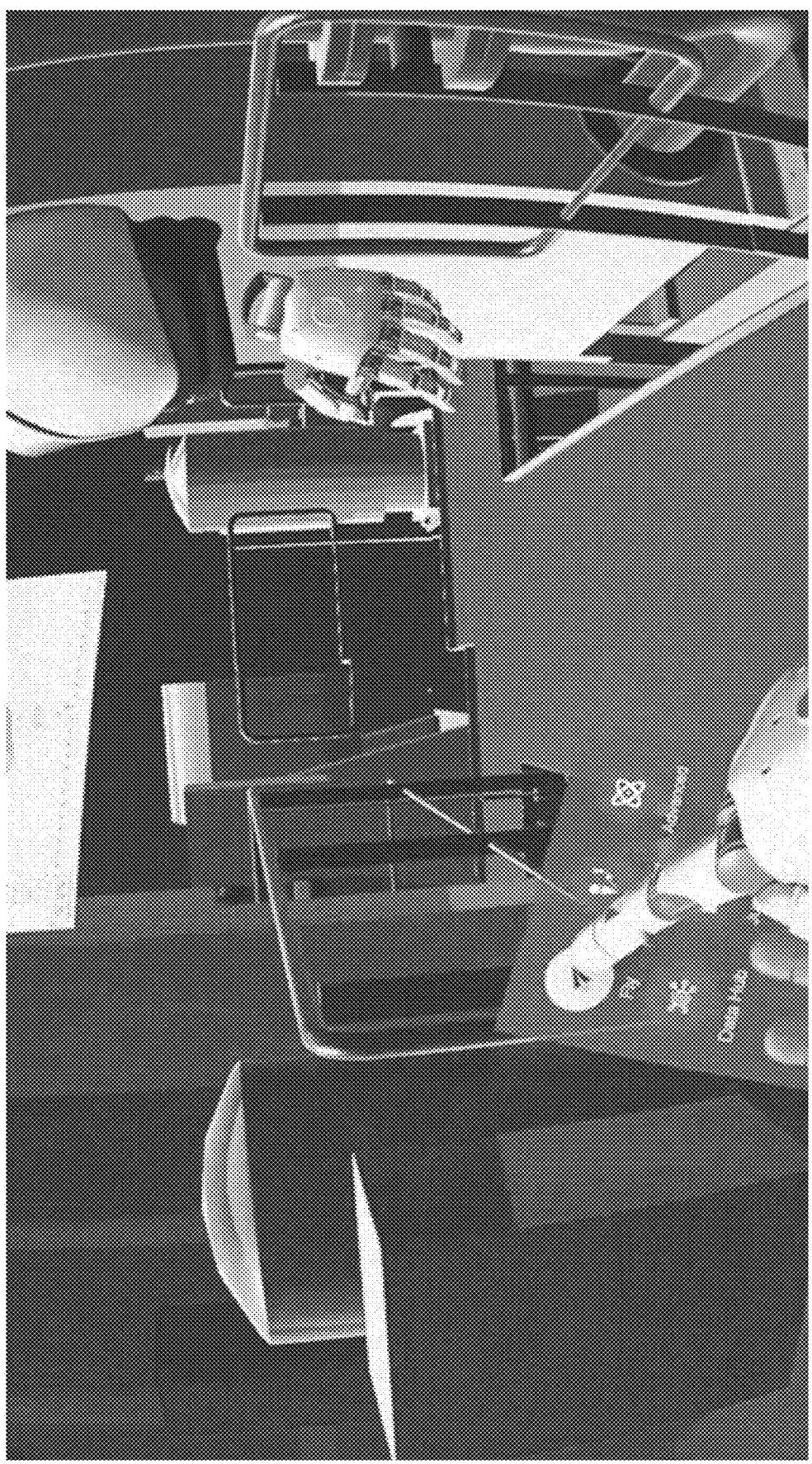
FIG. 36 illustrates a virtual CAD environment in the form of a ship engine room according to some embodiments.

FIG. 35 illustrates the user in front of a third portal to a third virtual environment according to some embodiments. In some embodiments, the system is configured to enable a user to enter a virtual computer aided drafting ("CAD") environment. In some embodiments, a virtual CAD environment includes a virtual representation (1D, 2D, 3D) of a computer aided drafting system display. In some embodiments, the virtual CAD environment includes a component and/or structure yet to exist in the physical world. FIG. 36 illustrates a virtual CAD environment in the form of a ship engine room according to some embodiments.

In some embodiments, the system is configured to record changes in a virtual environment. In some embodiments, the system is configured to record changes in a virtual CAD environment. In some embodiments, the system is configured to store the recordings in one or more databases such as a historian database according to some embodiments. In some embodiments, the system is configured to only store changes in the virtual environment. In some embodiments, by only storing the changes in the virtual environment, valuable computer storage resources are conserved. In some embodiments, the system is configured to enable a user to fast-forward, rewind, play, and pause virtual time while in the virtual environment to witness sequential changes in the virtual environment. In some embodiments, this enables a user to witness multiple structural and/or component changes performed over the life of a project in a fraction of real time.

Figure 37:
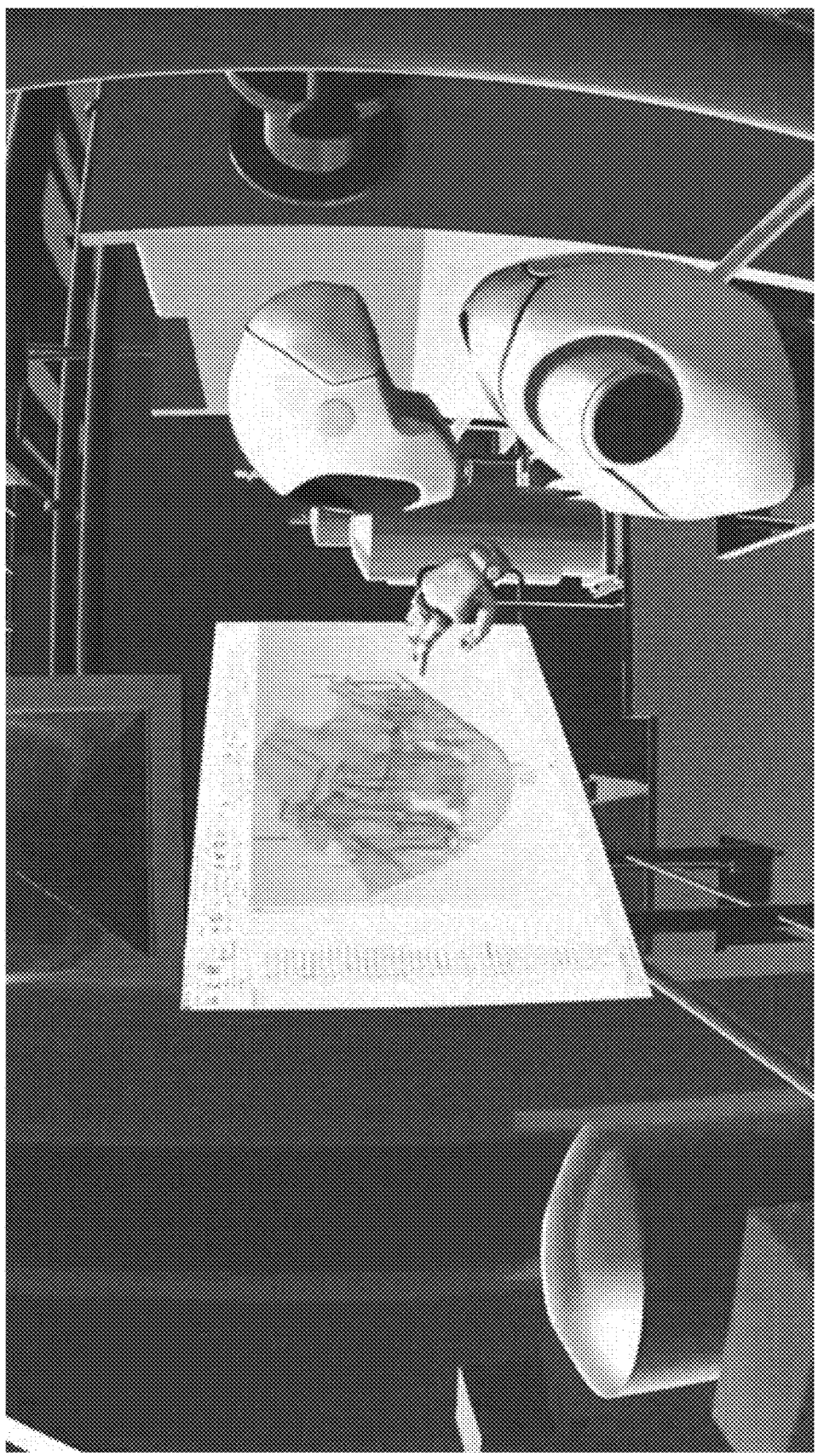
FIG. 37 illustrates a user initiating an analysis window according to some embodiments.
Figure 38:
FIG. 38 shows the user selecting the component in front of him in an analysis display.
Figure 39:
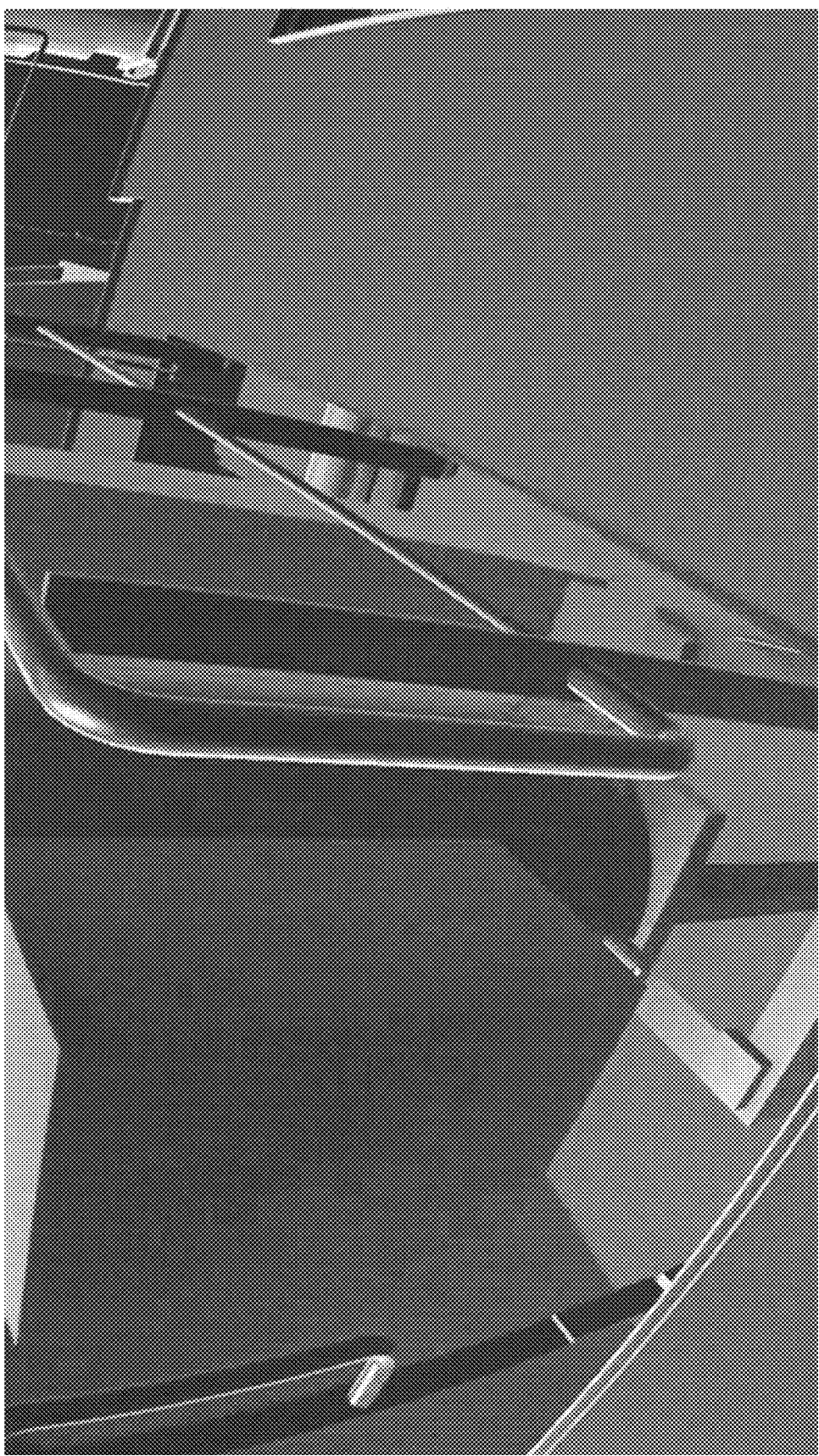
FIG. 39 shows the component in a vertically raised position from base below according to some embodiments.
Figure 40:
FIG. 40 shows the component lowered to the base by the user according to some embodiments.
Figure 41:
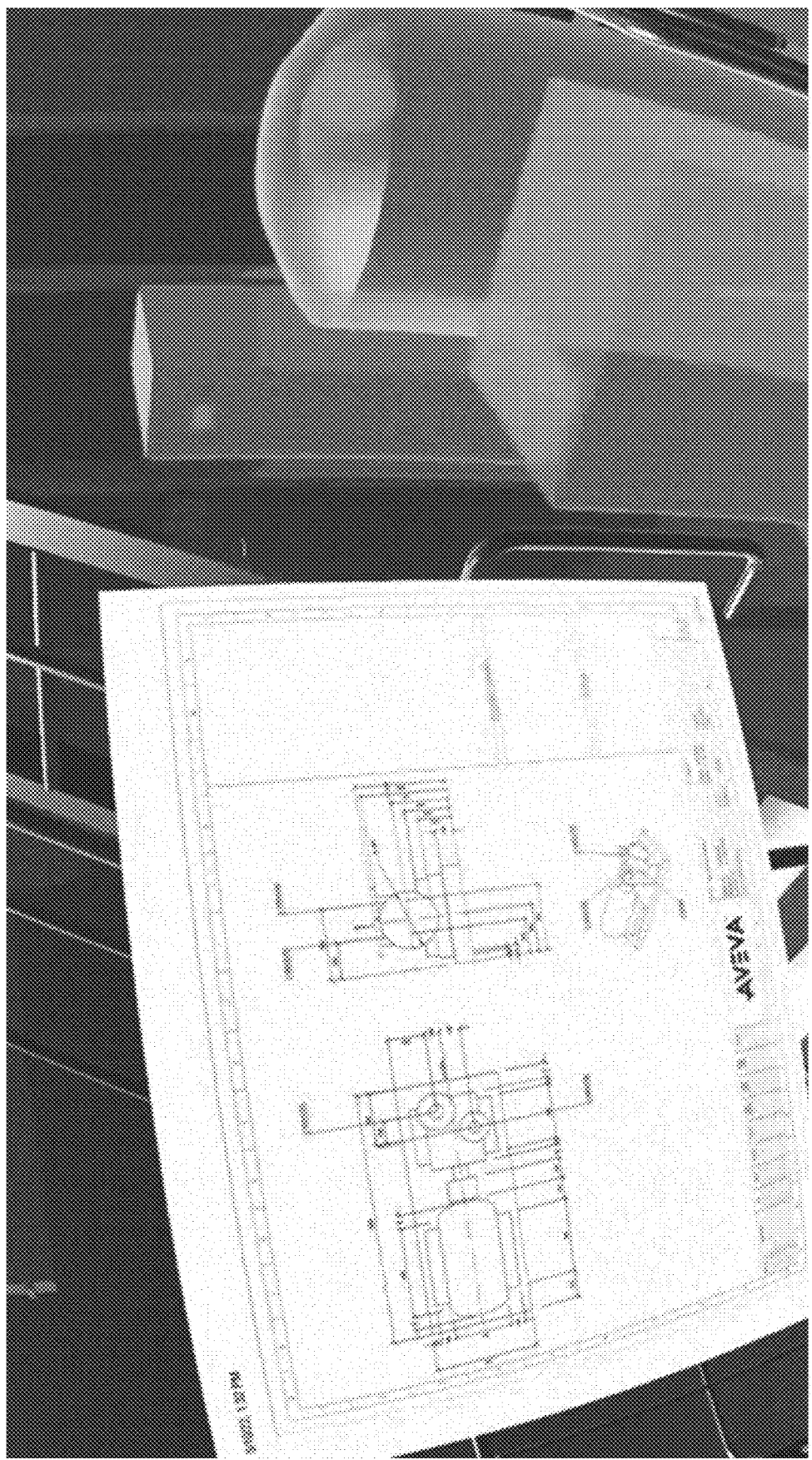
FIG. 41 shows the selection of the component and an analysis window displaying a 2D schematic of the component according to some embodiments.

FIG. 37 illustrates a user initiating an analysis window according to some embodiments. In some embodiments, the system is configured to enable a user to manipulate a component in a virtual environment. In some embodiments, non-limiting examples of manipulating a component include moving, rotating, initiating, fixing, adding, and/or deleting a component and/or structure. In some embodiments, the system is configured to enable a user to manipulate a component via an analysis display. FIG. 38 shows the user selecting the component in front of him in an analysis display. FIG. 39 shows the component in a vertically raised position from base below according to some embodiments. FIG. 40 shows the component lowered to the base by the user according to some embodiments. FIG. 41 shows the selection of the component and an analysis window displaying a 2D schematic of the component according to some embodiments.

Figure 42:
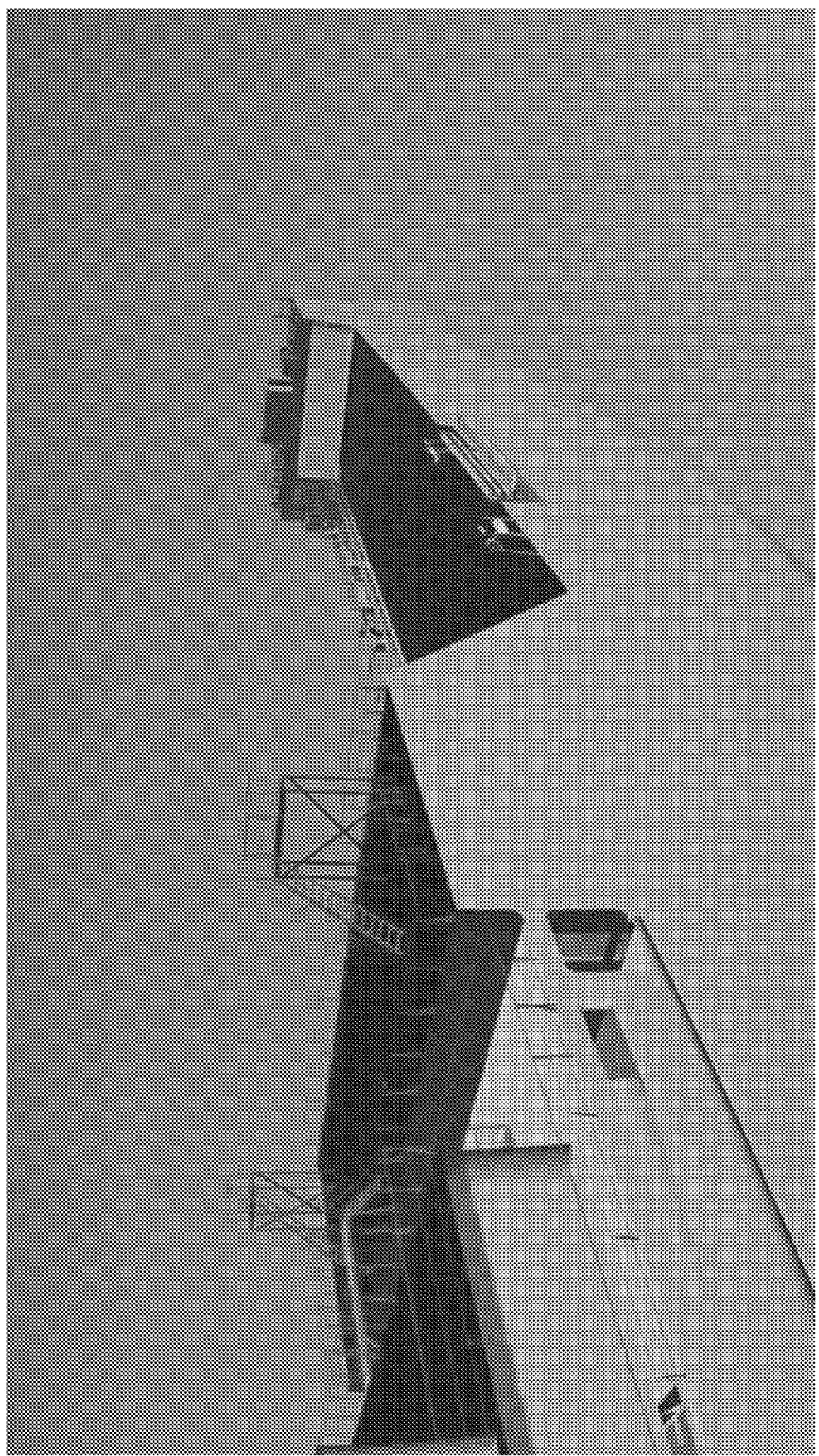
FIG. 42 depicts the user navigating out of the ship engine room to a CAD overview perspective using a fly mode according to some embodiments.
Figure 43:
FIG. 43 shows the user selecting a "jump to" option on the controller menu according to some embodiments.
Figure 44:
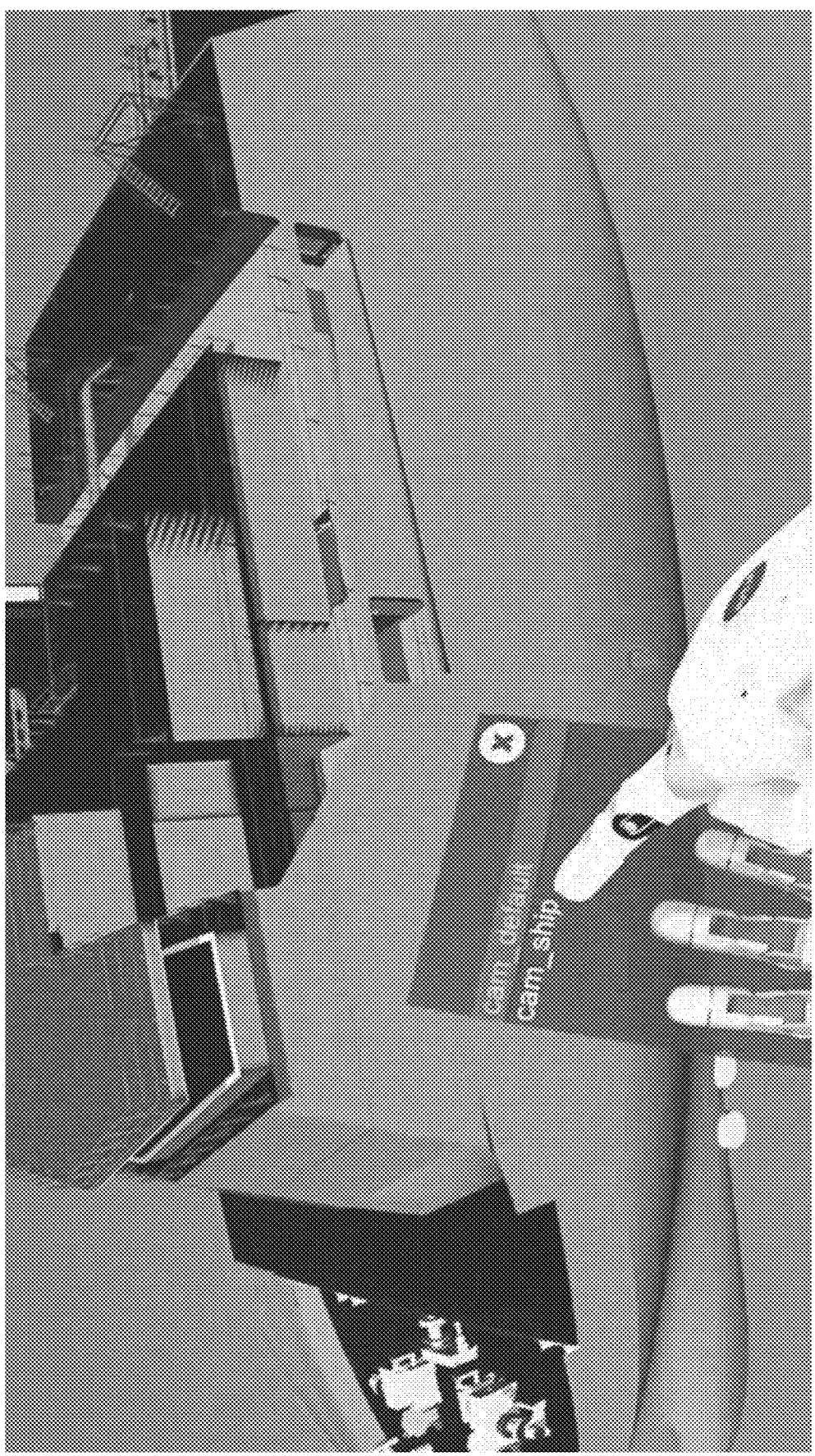
FIG. 44 illustrates the user selecting a jump location according to some embodiments.
Figure 45:
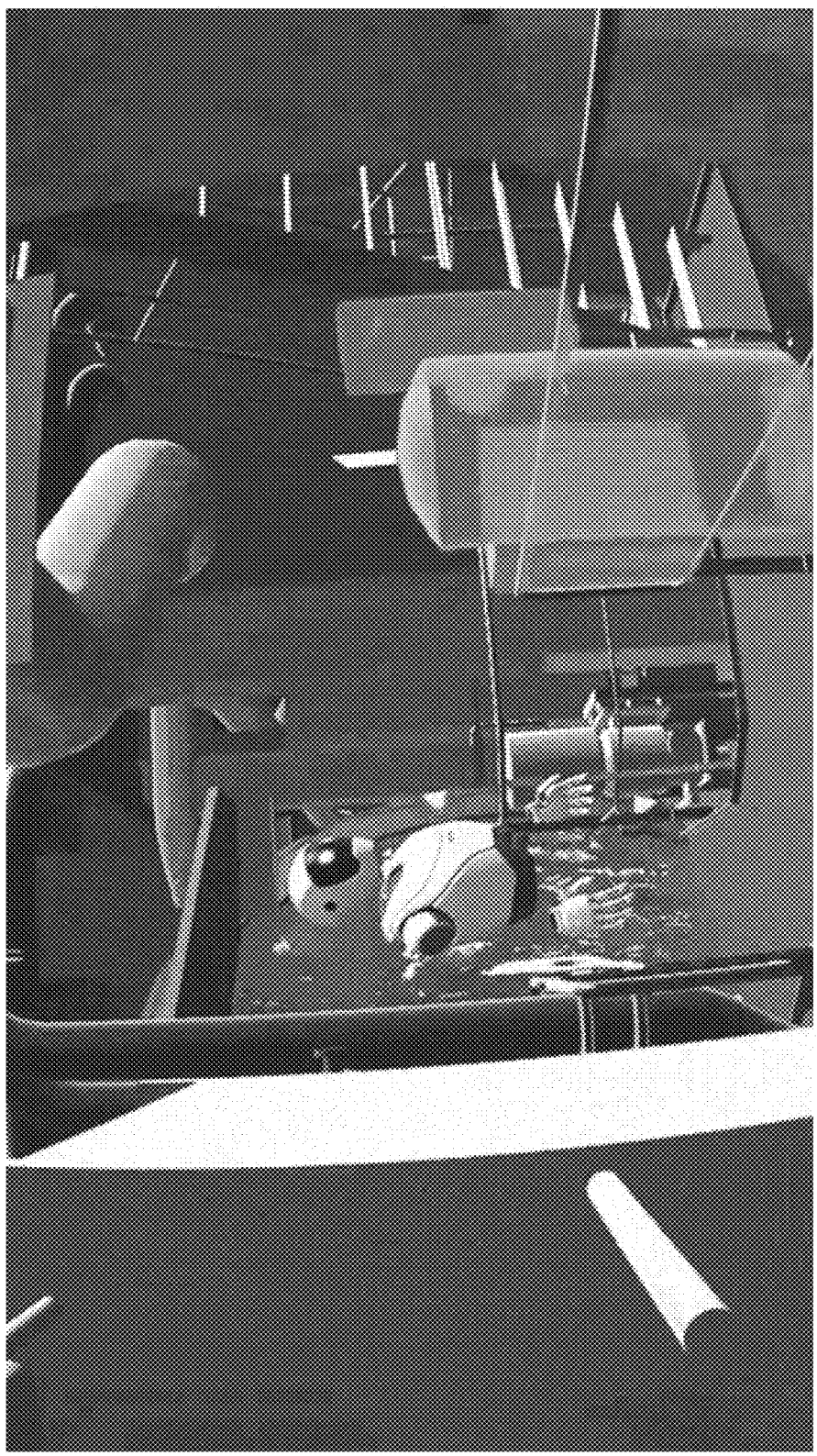
FIG. 45 depicts the user teleporting by jump to the jump location according to some embodiments.

FIG. 42 depicts the user navigating out of the ship engine room to a CAD overview perspective using a fly mode according to some embodiments. FIG. 43 shows the user selecting a "jump to" option on the controller menu according to some embodiments. FIG. 44 illustrates the user selecting a jump location according to some embodiments. FIG. 45 depicts the user teleporting by jump to the jump location according to some embodiments. In some embodiments, the jump location includes the portal entry. In some embodiments, the system is configured to enable a user to place one or more jump locations anywhere within a virtual environment.

FIG. 46 shows an overview of the concept of XR Modules according to some embodiments. In some embodiments, XR Modules support one or more integrated systems. In some embodiments, XR Modules support XR applications. In some embodiments, XR applications can interact with one or more of a desktop mouse, a keyboard, a Touch, a VR device such as a HoloLens 2, and a mobile telephone or other device. In some embodiments, integrated systems include those described herein, as well as AVEVA products such as CVP SDK and XR Studio.

In some embodiments, the (XR) modules are micro and/or independent components that enable a user to configure the system as a customized application. In some embodiments, the modules are independent from templates. In some embodiments, the modules can be easily customized and/or maintained.

Figure 47:
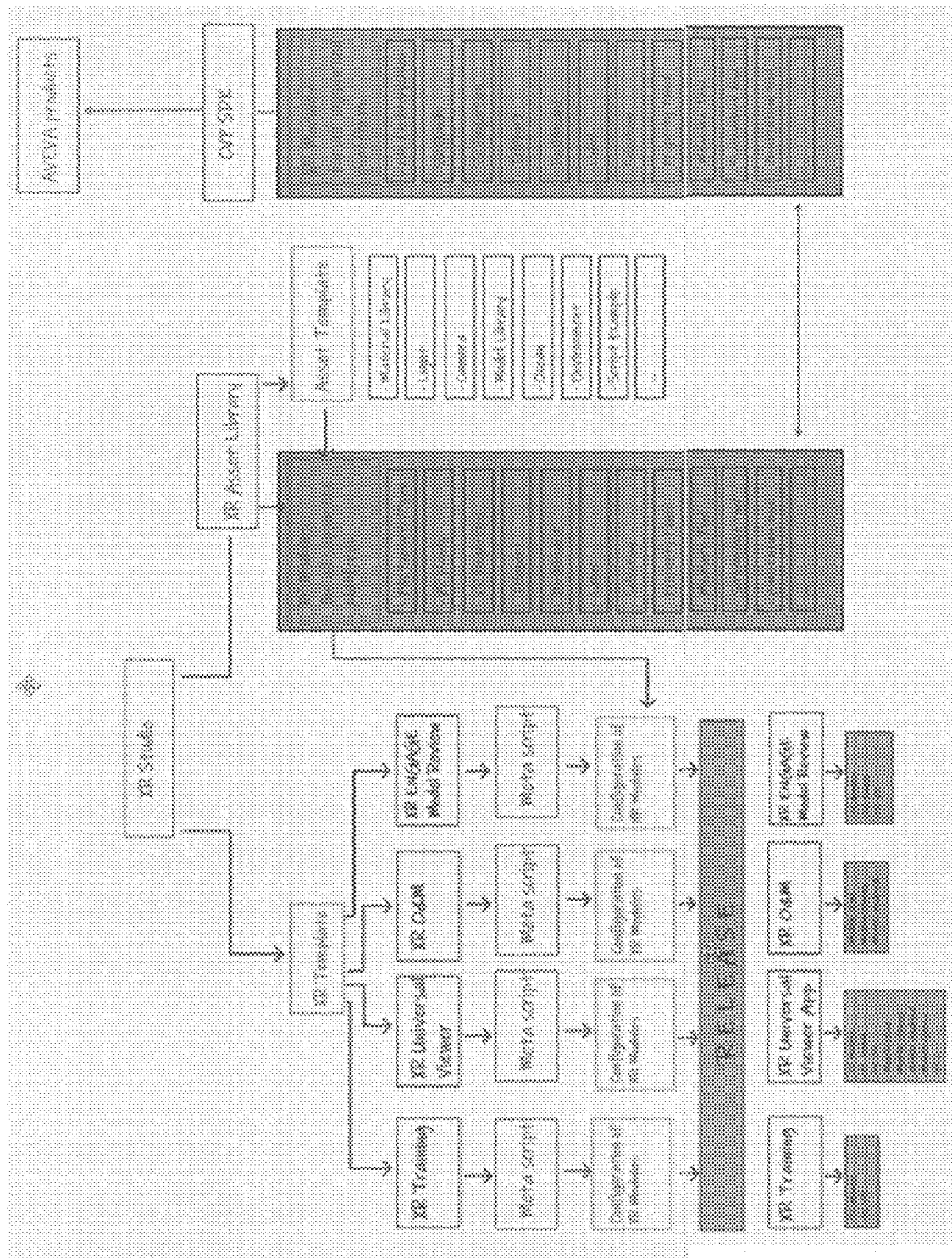
FIG. 47 illustrates system modules and connections between modules that form at least a portion of the system according to some embodiments according to some embodiments.
Figure 48:
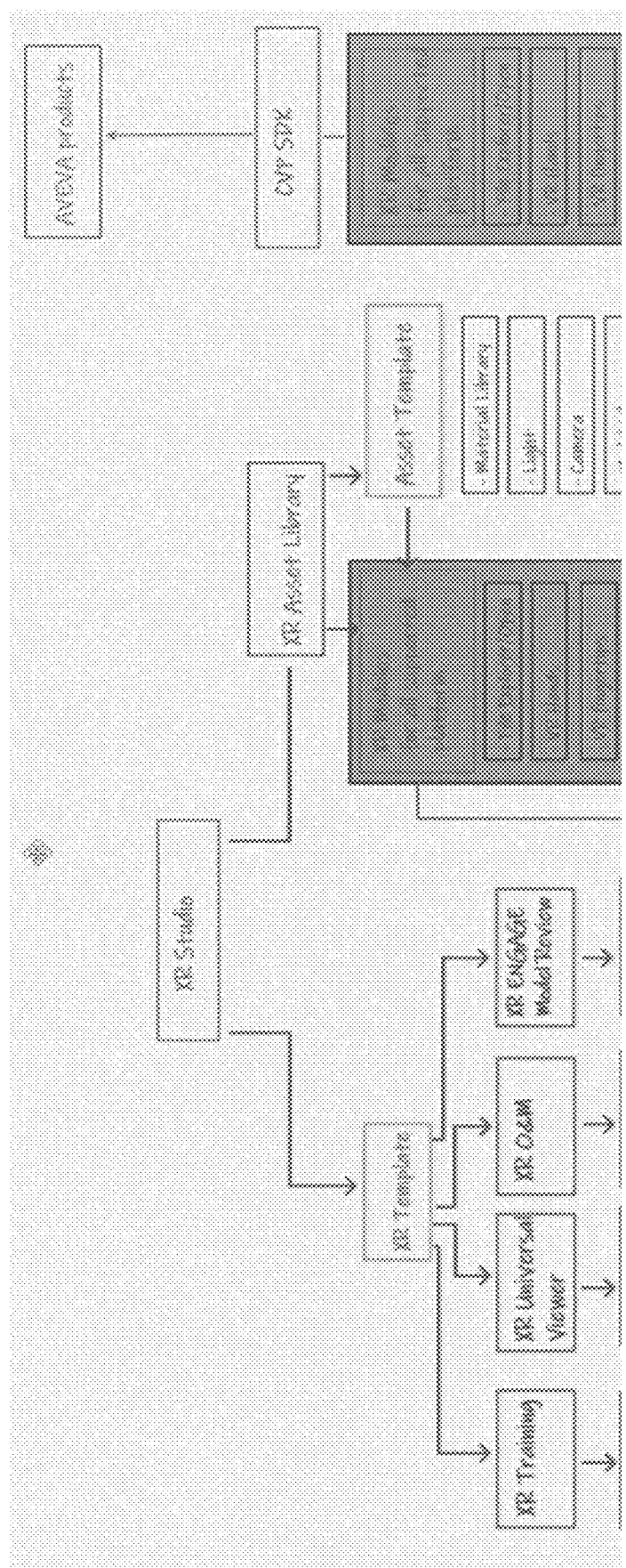
FIG. 48 is a first zoomed view of FIG. 47 according to some embodiments.
Figure 49:
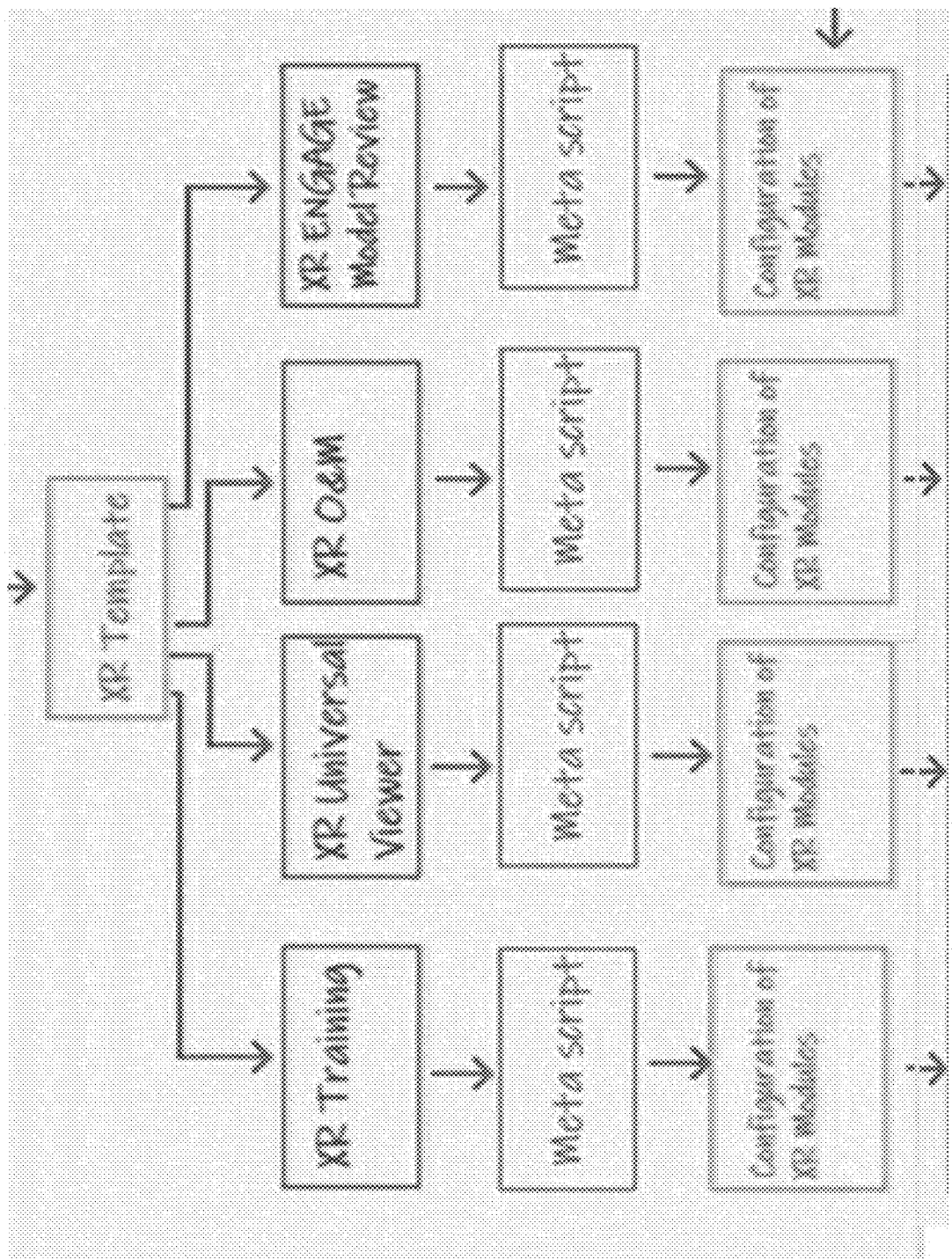
FIG. 49 is a second zoomed view of FIG. 47 according to some embodiments.
Figure 50:
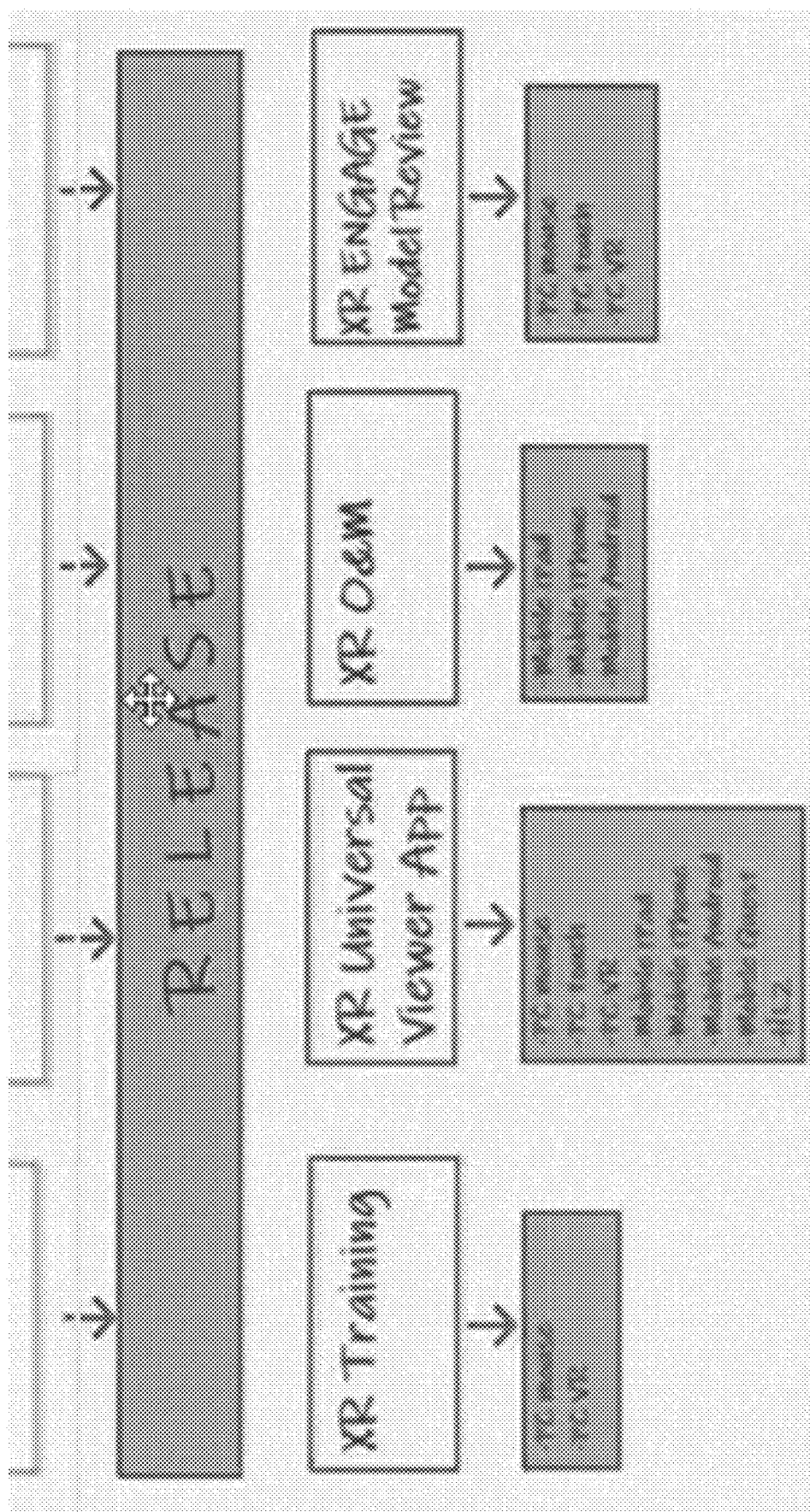
FIG. 50 is a third zoomed view according to some embodiments.
Figure 51:
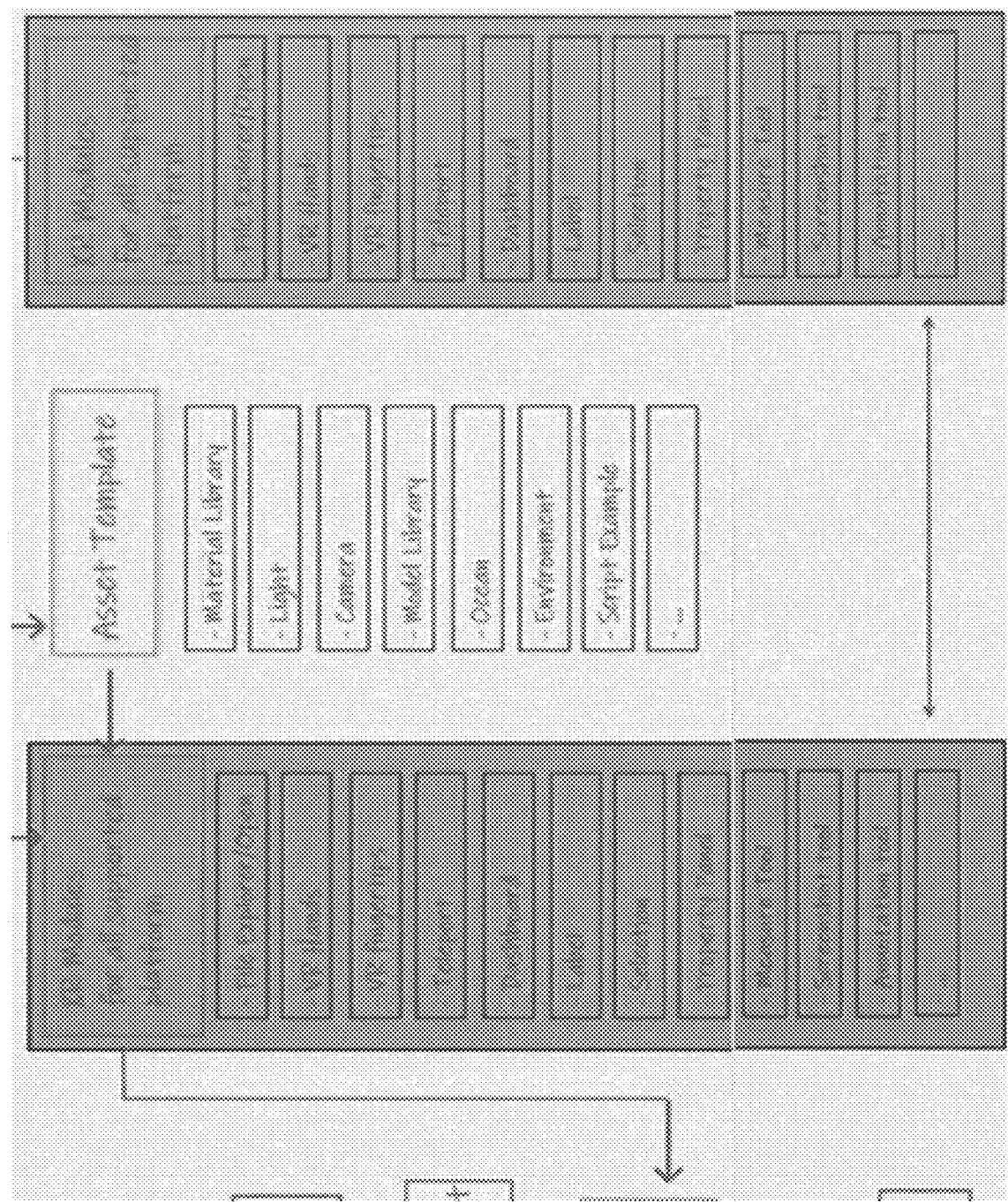
FIG. 51 is a fourth zoomed view of FIG. 47 according to some embodiments.
Figure 52:
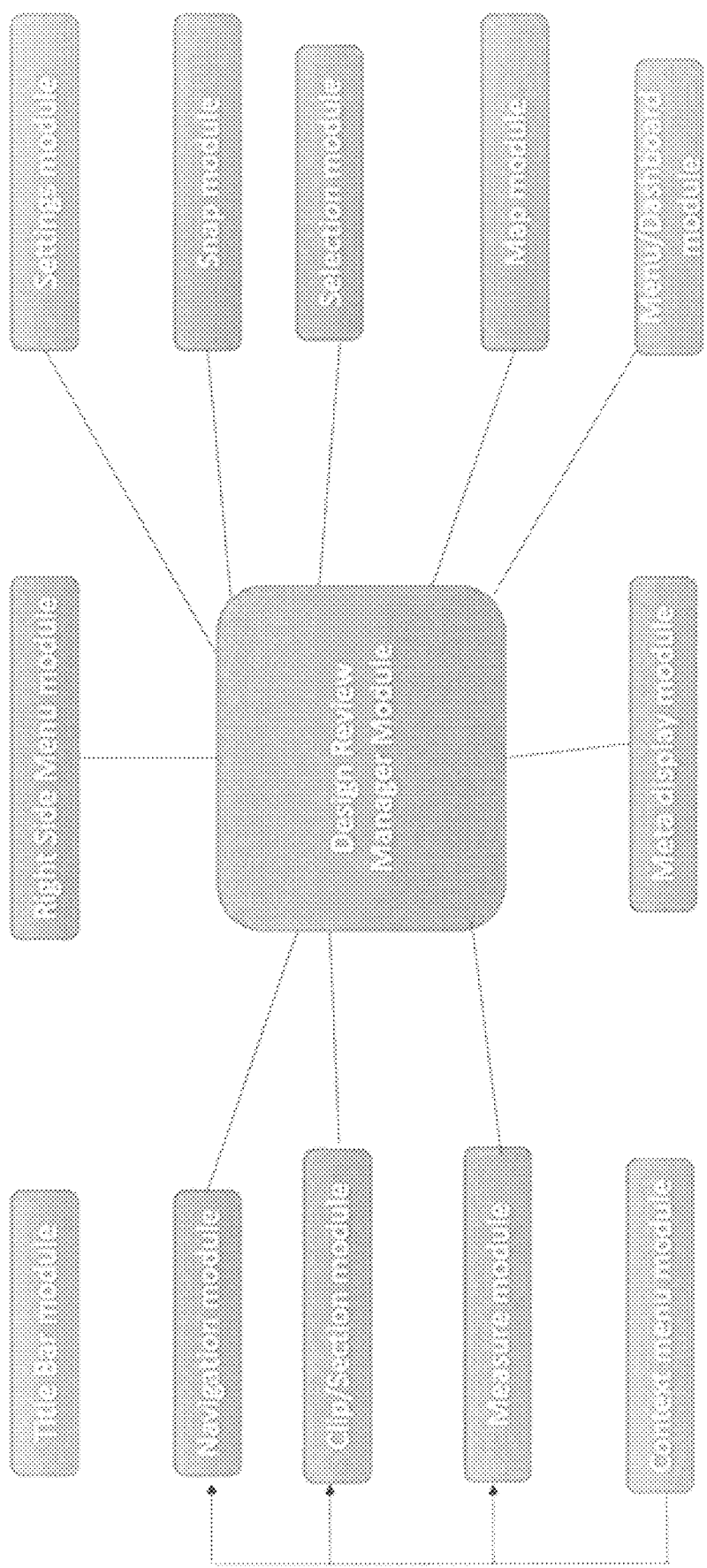
FIG. 52 illustrates additional system modules connected to a manager module according to some embodiments.

FIG. 47 illustrates system modules and connections between modules that form at least a portion of the system according to some embodiments according to some embodiments. FIG. 48 is a first zoomed view of FIG. 47 according to some embodiments. FIG. 49 is a second zoomed view of FIG. 47 according to some embodiments. FIG. 50 is a third zoomed view according to some embodiments. FIG. 51 is a fourth zoomed view of FIG. 47 according to some embodiments. FIG. 52 illustrates additional system modules connected to a manager module according to some embodiments.

Figure 53:
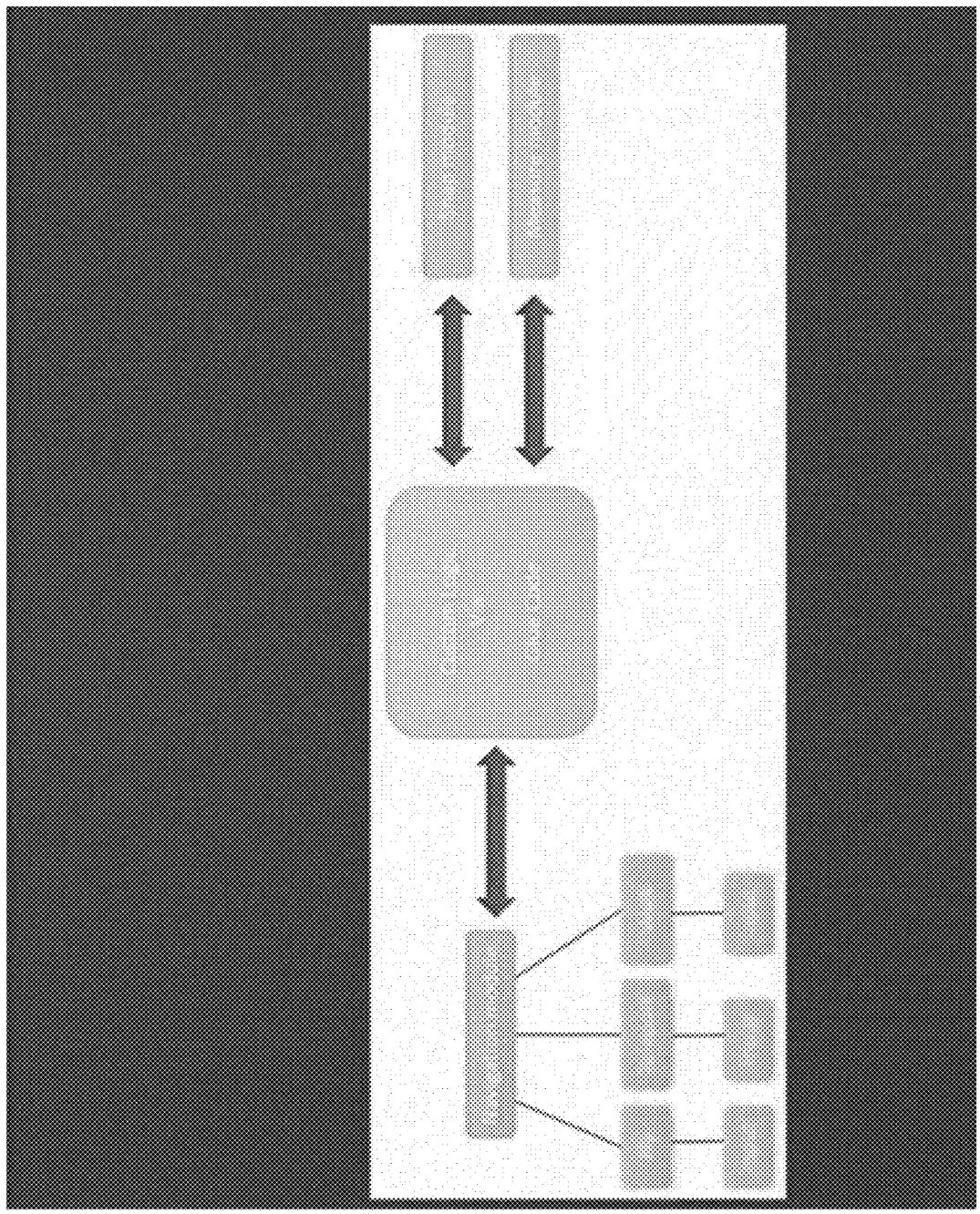
FIG. 53 is a diagram illustrating the concept of Glue Code according to some embodiments.

FIG. 53 is a diagram illustrating the concept of glue code according to some embodiments. In some embodiments, the glue code includes a script that helps facilitate communication between the modules so that end users can customize a template as required. In some embodiments, the system includes code samples within a template to aid users in customization. FIG. 54 includes an example glue code according to some embodiments. FIG. 55 illustrates a computer system 1010 enabling or comprising the systems and methods in accordance with some embodiments of the system. In some embodiments, the computer system 1010 can operate and/or process computer-executable code of one or more software modules of the aforementioned system and method. Further, in some embodiments, the computer system 1010 can operate and/or display information within one or more graphical user interfaces (e.g., HMIs) integrated with or coupled to the system.

In some embodiments, the computer system 1010 can comprise one or more processors 1032. In some embodiments, the one or more processors 1032 can reside in, or coupled to, one or more conventional server platforms (not shown). In some embodiments, the computer system 1010 can include a network interface 1035a and an application interface 1035b coupled to the least one processor 1032 capable of processing at least one operating system 1034. Further, in some embodiments, the interfaces 1035a, 1035b coupled to at least one processor 1032 can be configured to process one or more of the software modules (e.g., such as enterprise applications 1038). In some embodiments, the software application modules 1038 can include server-based software and can operate to host at least one user account and/or at least one client account, and operate to transfer data between one or more of these accounts using the at least one processor 1032.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1010 and on one or more non-transitory computer-readable storage media coupled to the computer system 1010 according to various embodiments. In addition, in some embodiments, the above-described applications of the system can be stored on computer-readable storage media within the computer system 1010 and on computer-readable storage media coupled to the computer system 1010. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1010 can comprise at least one computer readable medium 1036 coupled to at least one of at least one data source 1037a, at least one data storage 1037b, and/or at least one input/output 1037c. In some embodiments, the computer system 1010 can be embodied as computer readable code on a computer readable medium 1036. In some embodiments, the computer readable medium 1036 can be any data storage that can store data, which can thereafter be read by a computer (such as computer 1040). In some embodiments, the one or more non-transitory computer readable medium 1036 can be any physical or material medium that can be used to tangibly store the desired information or data or instructions and which can be accessed by a computer 1040 or processor 1032. In some embodiments, the computer readable medium 1036 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1036 can transmit or carry instructions to a remote computer 1040 and/or at least one user 1031, including a router, private or public network, or other transmission or channel, both wired and wireless. In some embodiments, the software application modules 1038 can be configured to send and receive data from a database (e.g., from a computer readable medium 1036 including data sources 1037a and data storage 1037b that can comprise a database), and data can be received by the software application modules 1038 from at least one other source. In some embodiments, at least one of the software application modules 1038 can be configured within the computer system 1010 to output data to at least one user 1031 via at least one graphical user interface rendered on at least one digital display.

In some embodiments, the one or more non-transitory computer readable media 1036 can be distributed over a conventional computer network via the network interface 1035a where the system embodied by the computer readable code can be stored and executed in a distributed fashion. For example, in some embodiments, one or more components of the computer system 1010 can be coupled to send and/or receive data through a local area network ("LAN") 1039a and/or an internet coupled network 1039b (e.g., such as a wireless internet). In some embodiments, the networks 1039a, 1039b can include wide area networks ("WAN"), direct connections (e.g., through a universal serial bus port), or other forms of computer-readable media 1036, or any combination thereof.

In some embodiments, components of the networks 1039a, 1039b can include any number of personal computers 1040 which include for example desktop computers, and/or laptop computers, or any fixed, generally non-mobile internet appliances coupled through the LAN 1039a. For example, some embodiments include one or more of personal computers 1040, databases 1041, and/or servers 1042 coupled through the LAN 1039a that can be configured for any type of user including an administrator. Some embodiments can include one or more personal computers 1040 coupled through network 1039b. In some embodiments, one or more components of the computer system 1010 can be coupled to send or receive data through an internet network (e.g., such as network 1039b). For example, some embodiments include at least one user 1031a, 1031b, is coupled wirelessly and accessing one or more software modules of the system including at least one enterprise application 1038 via an input and output ("I/O") 1037c. In some embodiments, the computer system 1010 can enable at least one user 1031a, 1031b, to be coupled to access enterprise applications 1038 via an I/O 1037c through LAN 1039a. In some embodiments, the user 1031 can comprise a user 1031a coupled to the computer system 1010 using a desktop computer, and/or laptop computers, or any fixed, generally non-mobile internet appliances coupled through the internet 1039b. In some embodiments, the user can comprise a mobile user 1031b coupled to the computer system 1010. In some embodiments, the user 1031b can connect using any mobile computing 1031c to wireless coupled to the computer system 1010, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of industrial analytics by using innovative hardware and software. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. Any figure depicting a graphical user interface is a disclosure of the system configured to display the contents of the graphical user interface. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for generating an industrial metaverse comprising:
    one or more computers comprising one or more processors and one or more non-transitory computer readable media, the one or more non-transitory computer readable media comprising program instructions stored thereon that when executed cause the one or more computers to:
        generate, by the one or more processors, a virtual environment comprising a three-dimensional (3D) representation of at least a portion of a physical industrial environment;
        generate, by the one or more processors, an asset link between one or more virtual assets in the virtual environment to one or more physical assets in the physical industrial environment;
        generate, by the one or more processors, one or more virtual models of the one or more physical assets;
        generate, by the one or more processors, a data link between the virtual environment and a historian database, the historian database comprising asset data about the one or more physical assets;
        generate, by the one or more processors, a virtual graphical user interface (GUI) in the virtual environment, the virtual GUI configured to enable a user to access and display the asset data in the virtual environment in a user's field of view, the user's field of view changing based on a position change of a user's head; and
        generate, by the one or more processors, one or more user controls in the virtual environment, the one or more user controls configured to navigate the virtual environment, select the one or more virtual assets, and control at least a portion of the virtual GUI.

2. The system of claim 1, wherein the asset data comprises at least one analytical result of raw data associated with the one or more virtual assets.

3. The system of claim 1, wherein selecting the one or more virtual assets comprises a manipulation of a virtual asset actuator.

4. The system of claim 3, wherein the manipulation of the virtual asset actuator results in a remote manipulation of a corresponding physical asset actuator.

5. The system of claim 4, wherein the physical asset actuator includes one or more of a lever, a valve, a switch, and a computer setting.

6. The system of claim 1, wherein each of
    the one or more virtual models comprise one or more mathematical equations configured to represent a physical behavior of the one or more physical assets.

7. The system of claim 1,
    wherein selecting the one or more virtual assets comprises a virtual manipulation of a virtual asset controller;
    wherein the virtual manipulation causes a change in one or more variables of the one or more virtual models; and
    wherein an effect of the change in the one or more variables is displayed in the virtual environment.

8. The system of claim 7,
    wherein the effect is a virtual effect;

wherein the virtual effect comprises theoretical results from calculations performed by the one or more virtual models; and wherein the virtual effect does not include a change to the one or more physical assets.

9. The system of claim 8, the one or more non-transitory computer readable media further comprising program instructions stored thereon that when executed cause the one or more computers to:

execute, by the one or more processors, a command by the user for a physical manipulation of the one or more physical assets corresponding to the virtual manipulation after the virtual effect occurs in the virtual environment.

10. The system of claim 1, the one or more non-transitory computer readable media further comprising program instructions stored thereon that when executed cause the one or more computers to:

receive, by the one or more processors, one or more images of the one or more physical assets;

execute, by the one or more processors, a comparison of the one or more images to one or more previous images of the one or more physical assets;

execute, by the one or more processors, an identification of a visual change in the one or more images based on the comparison; and alter, by the one or more processors, the one or more virtual assets in the virtual environment to reflect the visual change in the one or more images.

11. The system of claim 10, wherein the comparison includes an execution of an artificial intelligence; and wherein the artificial intelligence is trained using at least a portion of the one or more previous images.

12. The system of claim 10, the one or more non-transitory computer readable media further comprising program instructions stored thereon that when executed cause the one or more computers to:

predict, by the one or more processors, a variable change in one or more virtual models based on the visual change.

13. The system of claim 1, wherein selection of the one or more virtual assets in the virtual environment is configured to cause a display of a time-series graph to be generated in the virtual environment.

14. The system of claim 1, wherein the one or more virtual assets are connected to the one or more physical assets through a software-as-a-service (SaaS) subscription program.

15. The system of claim 1, wherein the physical industrial environment includes a supervisory control and data acquisition (SCADA) platform configured to monitor and/or control the one or more physical assets; and wherein at least a portion of the SCADA can be accessed via the virtual environment.

* * * * *